US011112826B2

(12) United States Patent
Ko et al.

(10) Patent No.: US 11,112,826 B2
(45) Date of Patent: Sep. 7, 2021

(54) ELECTRONIC DEVICE OF SLIDING TYPE

(71) Applicant: Samsung Electronics Co., Ltd., Suwon-si (KR)

(72) Inventors: Sungchan Ko, Suwon-si (KR); Donghun Kim, Suwon-si (KR); Jooho Seo, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 17/064,063

(22) Filed: Oct. 6, 2020

(65) Prior Publication Data

US 2021/0103314 A1 Apr. 8, 2021

(30) Foreign Application Priority Data

Oct. 7, 2019 (KR) .................... 10-2019-0124015

(51) Int. Cl.
  *G09G 5/00* (2006.01)
  *G06F 1/16* (2006.01)
  *G06F 3/0481* (2013.01)

(52) U.S. Cl.
  CPC .......... *G06F 1/1624* (2013.01); *G06F 1/1647* (2013.01); *G06F 1/1652* (2013.01); *G06F 3/04817* (2013.01)

(58) Field of Classification Search
  CPC .... G06F 1/1624; G06F 1/1637; G06F 1/1647; G06F 1/1652; G06F 1/1656; G06F 1/1681; G06F 1/1686; G06F 3/4817
  See application file for complete search history.

(56) References Cited

U.S. PATENT DOCUMENTS

| 8,711,566 | B2 | 4/2014 | O'Brien | |
|---|---|---|---|---|
| 9,195,272 | B2 | 11/2015 | O'Brien | |
| 10,306,783 | B2 * | 5/2019 | Seo | H05K 5/0226 |
| 10,433,438 | B2 * | 10/2019 | Moon | H05K 5/0086 |
| 10,448,521 | B2 * | 10/2019 | Seo | G09F 9/301 |
| 10,817,022 | B2 | 10/2020 | Cho et al. | |
| 10,820,433 | B2 * | 10/2020 | Cha | G09F 9/301 |
| 10,868,264 | B2 * | 12/2020 | Shin | H04M 1/0268 |

(Continued)

FOREIGN PATENT DOCUMENTS

| CN | 108833618 A | 11/2018 |
|---|---|---|
| CN | 208956089 U | 6/2019 |
| KR | 10-1837568 B1 | 3/2018 |

OTHER PUBLICATIONS

International Search Report dated Dec. 17, 2020, issued in International Application No. PCT/KR2020/012116.

*Primary Examiner* — Joe H Cheng
(74) *Attorney, Agent, or Firm* — Jefferson IP Law, LLP

(57) ABSTRACT

An electronic device is provided. The electronic device includes a first cover, a second cover that is coupled with the first cover and that performs a sliding operation, a display, an exposed area of which is changed in size in response to the sliding operation of the second cover, a panel support part that is disposed on one side of a rear surface of the display with respect to a front surface of the display and that includes a first hole exposed in response to the sliding operation of the second cover, a rotary shaft that makes contact with at least part of the panel support part and rotates in response to the sliding operation of the second cover, and a sensor, at least part of which is disposed under the first hole.

20 Claims, 11 Drawing Sheets

(56) References Cited

U.S. PATENT DOCUMENTS

| | | | |
|---|---|---|---|
| 2013/0058063 A1 | 3/2013 | O'Brien | |
| 2013/0201208 A1* | 8/2013 | Oho | G06F 3/0488 |
| | | | 345/619 |
| 2014/0204037 A1* | 7/2014 | Kim | G06F 3/03 |
| | | | 345/173 |
| 2014/0211399 A1 | 7/2014 | O'Brien | |
| 2016/0373654 A1* | 12/2016 | Kwon | G06F 3/04842 |
| 2017/0011714 A1* | 1/2017 | Eim | G09G 5/38 |
| 2017/0139442 A1* | 5/2017 | Yoshizumi | H04M 1/0247 |
| 2017/0140504 A1 | 5/2017 | Jeong et al. | |
| 2018/0102072 A1* | 4/2018 | Lee | G06F 3/147 |
| 2018/0374452 A1 | 12/2018 | Choi et al. | |
| 2019/0261519 A1* | 8/2019 | Park | H04N 9/3188 |
| 2019/0268455 A1* | 8/2019 | Baek | G06F 1/1681 |
| 2019/0297736 A1* | 9/2019 | Xu | G06F 1/1656 |
| 2019/0305237 A1 | 10/2019 | Shin et al. | |
| 2019/0317550 A1* | 10/2019 | Kim | G06F 1/1601 |
| 2020/0020255 A1* | 1/2020 | Yoon | H05K 5/0017 |
| 2020/0233465 A1 | 7/2020 | Lim | |
| 2020/0329572 A1* | 10/2020 | Wittenberg | H05K 5/0017 |
| 2020/0383219 A1* | 12/2020 | Hale | E05D 3/18 |

\* cited by examiner

ELECTRONIC DEVICE OF SLIDING TYPE

CROSS-REFERENCE TO RELATED APPLICATION(S)

This application is based on and claims priority under 35 U.S.C. § 119(a) of a Korean patent application number 10-2019-0124015, filed on Oct. 7, 2019, in the Korean Intellectual Property Office, the disclosure of which is incorporated by reference herein in its entirety.

BACKGROUND

1. Field

The disclosure relates to a sensor related structure of an electronic device having a display area that is extended through a sliding operation.

2. Description of Related Art

Recently, in view of various purposes, such as portability, availability, and the like, portable electronic devices have been manufactured in a form in which the portable electronic devices are equipped with displays having various sizes. In addition, to meet various needs of users, electronic devices having size-adjustable displays have been developed. For example, studies on a flexible display mounted in a roll structure in an electronic device have been increasingly conducted. A rolled area of the flexible display in the roll structure may be unrolled depending on structural deformation of the electronic device, and accordingly the flexible display may be extended to have a large area.

The above information is presented as background information only to assist with an understanding of the disclosure. No determination has been made, and no assertion is made, as to whether any of the above might be applicable as prior art with regard to the disclosure.

SUMMARY

At least one sensor may be disposed under the above-described display. In the electronic device supporting a sliding operation of the roll structure, part of the display may be extended or reduced through the sliding operation. Accordingly, a study on optimizing the arrangement of the at least one sensor, the structure of the at least one sensor, or the shape of a structure around the sensor is required.

Aspects of the disclosure are to address at least the above-mentioned problems and/or disadvantages and to provide at least the advantages described below. Accordingly, an aspect of the disclosure is to provide an electronic device of a sliding type that has an optimal sensor related structure associated with performing a function of a sensor in the electronic device that performs a sliding operation.

In accordance with an aspect of the disclosure, an electronic device is provided. The electronic device includes a first cover, a second cover that is coupled with the first cover and that performs a sliding operation, a display, an exposed area of which is changed in size in response to the sliding operation of the second cover, a panel support part that is disposed on one side of a rear surface of the display with respect to a front surface of the display and that includes a first hole exposed in response to the sliding operation of the second cover, a rotary shaft that makes contact with at least part of the panel support part and rotates in response to the sliding operation of the second cover, and a sensor, at least part of which is disposed under the first hole.

Other aspects, advantages, and salient features of the disclosure will become apparent to those skilled in the art from the following detailed description, which, taken in conjunction with the annexed drawings, discloses various embodiments of the disclosure.

BRIEF DESCRIPTION OF THE DRAWINGS

The above and other aspects, features, and advantages of certain embodiments of the disclosure will be more apparent from the following description taken in conjunction with the accompanying drawings, in which.

Throughout the drawings, like reference numerals will be understood to refer to like parts, components, and structures.

DETAILED DESCRIPTION

Figure 1:
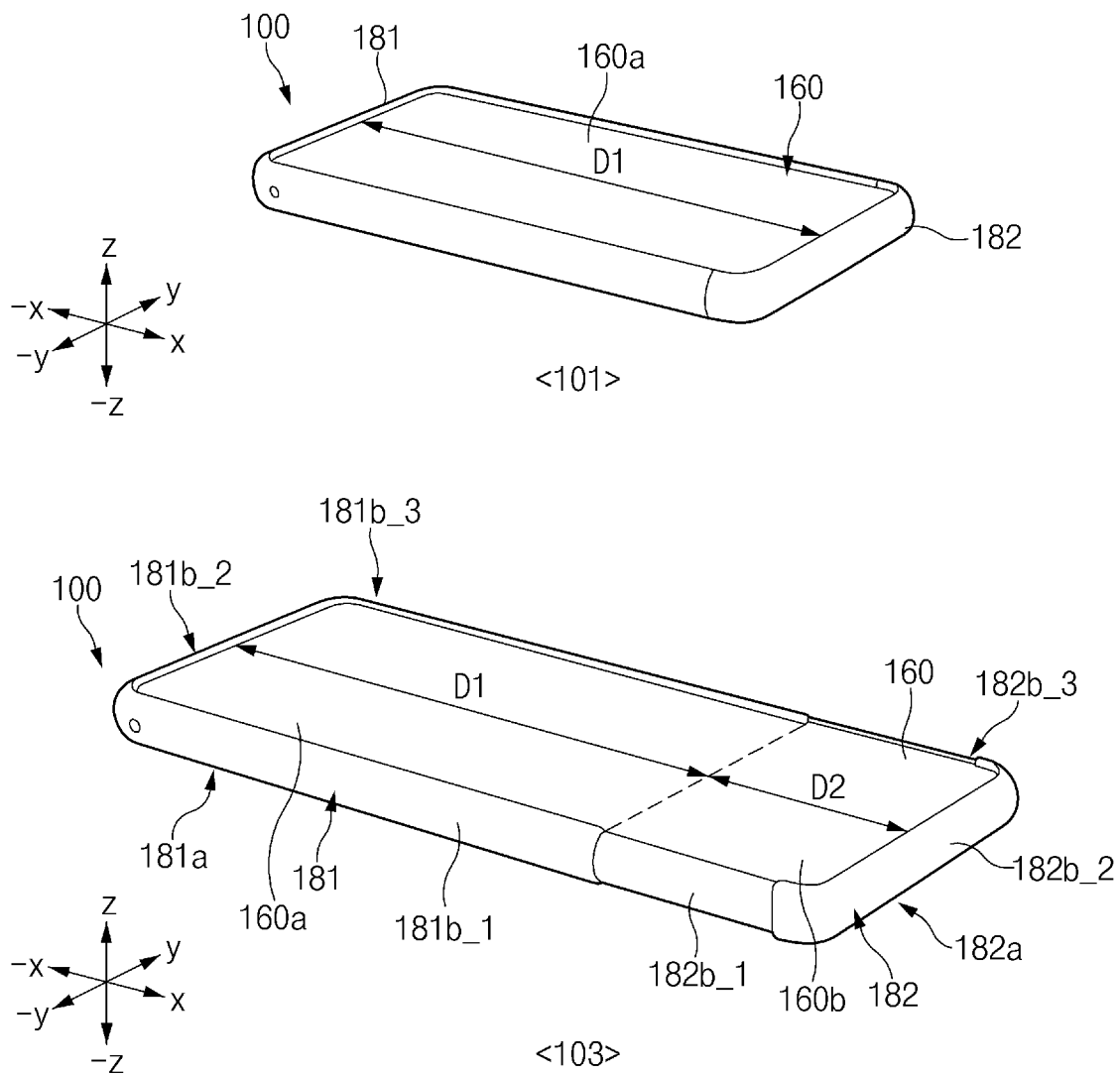
FIG. 1 is a view illustrating an exterior of an electronic device of a sliding type according to an embodiment of the disclosure.

The following description with reference to the accompanying drawings is provided to assist in a comprehensive understanding of various embodiments of the disclosure as defined by the claims and their equivalents. It includes various specific details to assist in that understanding but these are to be regarded as merely exemplary. Accordingly, those of ordinary skill in the art will recognize that various changes and modifications of the various embodiments described herein can be made without departing from the scope and spirit of the disclosure. In addition, descriptions of well-known functions and constructions may be omitted for clarity and conciseness.

The terms and words used in the following description and claims are not limited to the bibliographical meanings, but, are merely used by the inventor to enable a clear and consistent understanding of the disclosure. Accordingly, it should be apparent to those skilled in the art that the following description of various embodiments of the disclosure is provided for illustration purpose only and not for the purpose of limiting the disclosure as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

In the disclosure, the expressions "have", "may have", "include" and "comprise", or "may include" and "may comprise" used herein indicate existence of corresponding features (e.g., components, such as numeric values, functions, operations, or parts) but do not exclude presence of additional features.

In the disclosure, the expressions "A or B", "at least one of A or/and B", or "one or more of A or/and B", and the like may include any and all combinations of one or more of the associated listed items. For example, the term "A or B", "at least one of A and B", or "at least one of A or B" may refer to all of the case (1) where at least one A is included, the case (2) where at least one B is included, or the case (3) where both of at least one A and at least one B are included.

The terms, such as "first", "second", and the like used in the disclosure may be used to refer to various components regardless of the order and/or the priority and to distinguish the relevant components from other components, but do not limit the components. For example, "a first user device" and "a second user device" indicate different user devices regardless of the order or priority. For example, without departing the scope of the disclosure, a first component may be referred to as a second component, and similarly, a second component may be referred to as a first component.

It will be understood that when a component (e.g., a first component) is referred to as being "(operatively or communicatively) coupled with/to" or "connected to" another component (e.g., a second component), it may be directly coupled with/to or connected to the other component or an intervening component (e.g., a third component) may be present. In contrast, when a component (e.g., a first component) is referred to as being "directly coupled with/to" or "directly connected to" another component (e.g., a second component), it should be understood that there are no intervening component (e.g., a third component).

According to the situation, the expression "configured to" used in the disclosure may be used as, for example, the expression "suitable for", "having the capacity to", "designed to", "adapted to", "made to", or "capable of". The term "configured to" must not mean only "specifically designed to" in hardware. Instead, the expression "a device configured to" may mean that the device is "capable of" operating together with another device or other parts. For example, a "processor configured to (or set to) perform A, B, and C" may mean a dedicated processor (e.g., an embedded processor) for performing a corresponding operation or a generic-purpose processor (e.g., a central processing unit (CPU) or an application processor) which performs corresponding operations by executing one or more software programs which are stored in a memory device.

Terms used in the disclosure are used to describe specified embodiments and are not intended to limit the scope of the disclosure. The terms of a singular form may include plural forms unless otherwise specified. All the terms used herein, which include technical or scientific terms, may have the same meaning that is generally understood by a person skilled in the art. It will be further understood that terms, which are defined in a dictionary and commonly used, should also be interpreted as is customary in the relevant related art and not in an idealized or overly formal unless expressly so defined in various embodiments of the disclosure. In some cases, even if terms are terms which are defined in the disclosure, they may not be interpreted to exclude embodiments of the disclosure.

An electronic device according to various embodiments of the disclosure may include at least one of, for example, smartphones, tablet personal computers (PCs), mobile phones, video telephones, electronic book readers, desktop PCs, laptop PCs, netbook computers, workstations, servers, personal digital assistants (PDAs), portable multimedia players (PMPs), moving picture experts group (MPEG-1 or MPEG-2) audio layer 3 (MP3) players, mobile medical devices, cameras, or wearable devices. According to various embodiments of the disclosure, the wearable device may include at least one of an accessory type (e.g., watches, rings, bracelets, anklets, necklaces, glasses, contact lens, or head-mounted-devices (HMDs)), a fabric or garment-integrated type (e.g., an electronic apparel), a body-attached type (e.g., a skin pad or tattoos), or a bio-implantable type (e.g., an implantable circuit).

Hereinafter, electronic devices according to various embodiments will be described with reference to the accompanying drawings. In the disclosure, the term "user" may refer to a person who uses an electronic device or may refer to a device (e.g., an artificial intelligence electronic device) that uses the electronic device.

FIG. 1 is a view illustrating an exterior of an electronic device of a sliding type according to an embodiment of the disclosure.

Referring to FIG. 1, an electronic device 100 according to the embodiment may include a display 160 (e.g., a flexible display, at least part of which has flexibility), a first cover 181, and a second cover 182. The first cover 181 may serve as a fixing cover that fixes one side of the display 160.

The first cover 181 may include a first bottom portion 181a, a first upper sidewall 181b_1, a second upper sidewall 181b_2, and a third upper sidewall 181b_3. The first upper sidewall 181b_1, the second upper sidewall 181b_2, and the third upper sidewall 181b_3 may extend from edges of the first bottom portion 181a to surround at least some of side surfaces of the display 160.

At least part of the first upper sidewall 181b_1 may vertically extend by a specified height from an edge of the first bottom portion 181a that faces in a fourth direction (−y-axis direction). At least part of the second upper sidewall 181b_2 may vertically extend by the specified height from an edge of the first bottom portion 181a that faces in a second direction (−x-axis direction). An edge of the second upper sidewall 181b_2 that faces in the fourth direction (−y-axis direction) may be disposed to make contact with an edge of the first upper sidewall 181b_1 that faces in the second direction (−x-axis direction). At least part of the third upper sidewall 181b_3 may vertically extend by the specified height from an edge of the first bottom portion 181a that faces in a third direction (y-axis direction). An edge of the third upper sidewall 181b_3 that faces in the second direction (−x-axis direction) may be disposed to make contact with an edge of the second upper sidewall 181b_2 that faces in the third direction (y-axis direction). The first upper sidewall 181b_1, the second upper sidewall 181b_2, and the third upper sidewall 181b_3 may have the same height. No separate sidewall may be formed at an edge of the first bottom portion 181a that faces in a first direction (x-axis direction), and the first cover 181 may be open at one side including the edge. The first cover 181 may be coupled with the second cover 182 in the first direction (x-axis direction).

The second cover 182 may be moved relative to the first cover 181 in the first direction (e.g., the x-axis direction) or the second direction (e.g., the −x-axis direction opposite to the first direction). Similarly to the first cover 181, the second cover 182 may include a second bottom portion 182*a*, a first lower sidewall 182*b*_1, a second lower sidewall 182*b*_2, and a third lower sidewall 182*b*_3. The first lower sidewall 182*b*_1, the second lower sidewall 182*b*_2, and the third lower sidewall 182*b*_3 may extend from edges of the second bottom portion 182*a* to surround at least some of the side surfaces of the display 160. At least part of the first lower sidewall 182*b*_1 may vertically extend by a specified height from an edge of the second bottom portion 182*a* that faces in the fourth direction (−y-axis direction). The first lower sidewall 182*b*_1 may have different heights depending on positions. For example, a portion of the first lower sidewall 182*b*_1 that is disposed close to the second lower sidewall 182*b*_2 may have a greater height than another portion of the first lower sidewall 182*b*_1 (e.g., a portion disposed close to the first upper sidewall 181*b*_1). Furthermore, a side surface of the first lower sidewall 182*b*_1 may have different heights depending on positions. For example, a portion of the side surface of the first lower sidewall 182*b*_1 that is disposed close to the second lower sidewall 182*b*_2 may have a greater height than another portion of the side surface of the first lower sidewall 182*b*_1 (e.g., a portion of the side surface that is disposed close to the first upper sidewall 181*b*_1). A portion of the first lower sidewall 182*b*_1 (e.g., the portion disposed close to the first upper sidewall 181*b*_1) may be moved into the first cover 181, or may be moved out of the first cover 181 in the first direction (x-axis direction), depending on a sliding operation.

At least part of the second lower sidewall 182*b*_2 may vertically extend by a specified height from an edge of the second bottom portion 182*a* that faces in the first direction (x-axis direction). An edge of the second lower sidewall 182*b*_2 that faces in the fourth direction (−y-axis direction) may be disposed to make contact with an edge of the first lower sidewall 182*b*_1 that faces in the first direction (x-axis direction). The second lower sidewall 182*b*_2 may have the same height as the portion of the first lower sidewall 182*b*_1 that is adjacent to the second lower sidewall 182*b*_2.

At least part of the third lower sidewall 182*b*_3 may vertically extend by a specified height from an edge of the second bottom portion 182*a* that faces in the third direction (y-axis direction). An edge of the third lower sidewall 182*b*_3 that faces in the first direction (x-axis direction) may be disposed to make contact with an edge of the second lower sidewall 182*b*_2 that faces in the third direction (y-axis direction). A portion of the third lower sidewall 182*b*_3 (e.g., a portion disposed close to the second lower sidewall 182*b*_2) may have the same height as the second lower sidewall 182*b*_2. Another portion of the third lower sidewall 182*b*_3 (e.g., a portion disposed close to the third upper sidewall 181*b*_3) may have a smaller height than the second lower sidewall 182*b*_2. Likewise to the side surface of the first lower sidewall 182*b*_1, a side surface of the third lower sidewall 182*b*_3 may include an operation portion. The third lower sidewall 182*b*_3 may be coupled with the third upper sidewall 181*b*_3 and may be slid along an inside surface of the third upper sidewall 181*b*_3. No separate sidewall may be formed at an edge of the second bottom portion 182*a* that faces in the second direction (−x-axis direction), and the second cover 182 may be open at one side including the edge. The second cover 182 may be coupled with the first cover 181 in the second direction (−x-axis direction).

When the first cover 181 and the second cover 182 overlap each other by a first width as in a state 101 (a state before the display 160 is extended), a first display area 160*a* having a first size may be disposed to face in an upper direction (z-axis direction). In the state 101, the display 160 may include the first display area 160*a* that has the first size and that is exposed to the outside. As the first cover 181 and the second cover 182 are disposed adjacent to each other, the first upper sidewall 181*b*_1 of the first cover 181 may be disposed side by side with the first lower sidewall 182*b*_1 of the second cover 182 at the same height, and the third upper sidewall 181*b*_3 of the first cover 181 may be disposed side by side with the third lower sidewall 182*b*_3 of the second cover 182 at the same height.

The first cover 181 may be disposed to surround edges of the first display area 160*a* (e.g., at least part of the first display area 160*a* that faces in the second direction (−x-axis direction), at least part of the first display area 160*a* that faces in the third direction (y-axis direction), at least part of the first display area 160*a* that faces in the fourth direction (−y-axis direction), and at least part of the first display area 160*a* that faces in a fifth direction (−z-axis direction opposite to z-axis direction)). In the state 101, at least part of a second display area 160*b* extending from the first display area 160*a* may be rolled or unrolled inside at least one of the first cover 181 or the second cover 182. In this state, an upper surface of the first display area 160*a* through which pixels irradiate light may face in a front direction (z-axis direction), and at least part of an upper surface of the second display area 160*b* in which pixels are disposed may face in a rear direction (−z-axis direction). In the state 101, part of the second display area 160*b* may be disposed in a state of being bent.

When the second cover 182 is moved relative to the first cover 181 in the first direction (x-axis direction), the exposed area of the display 160 may be extended. For example, when the first cover 181 and the second cover 182 overlap each other by a second width (e.g., a width being smaller than the first width) as in a state 103 (e.g., a state in which the second cover 182 is slid to extend the area of the display 160), the display 160 may include the first display area 160*a* that has the first size (e.g., a size with a horizontal length corresponding to a first length D1) and that is exposed to the outside, that is, faces in the upper direction (z-axis direction) and the second display area 160*b* that has a second size (e.g., a size with a horizontal length corresponding to a second length D2) and that faces in the front direction (z-axis direction). In the state 103, the first size of the first display area 160*a* may be the same as the second size of the second display area 160*b*. Alternatively, the first size may be larger than the second size. According to various embodiments of the disclosure, the second size may vary depending on the distance by which the second cover 182 is slid or moved.

In the state 101, part of the display 160 may be maintained in a rolled state, and in the state 103, at least part of the display 160 in the rolled state may have an unrolled state. The second cover 182 may be disposed to surround at least part of the second display area 160*b* that faces in the first direction (x-axis direction), at least part of the second display area 160*b* that faces in the third direction (y-axis direction), at least part of the second display area 160*b* that faces in the fourth direction (−y-axis direction), and at least part of the second display area 160*b* that faces in the fifth direction (−z-axis direction). According to various embodiments of the disclosure, at least part of the second cover 182 may be connected with the inside of the first cover 181, and the second cover 182 may be slid along the inside surface of the first cover 181 in one of the first direction (x-axis direction) and the second direction (−x-axis direction). The first cover 181 and the second cover 182 may surround the periphery of the display 160 while the first cover 181 and the second cover 182 are slid. Various electronic components associated with driving the display 160, electronic components associated with various user functions supported by the electronic device 100, a battery, and the like may be disposed inside the first cover 181 and the second cover 182.

Figure 2:
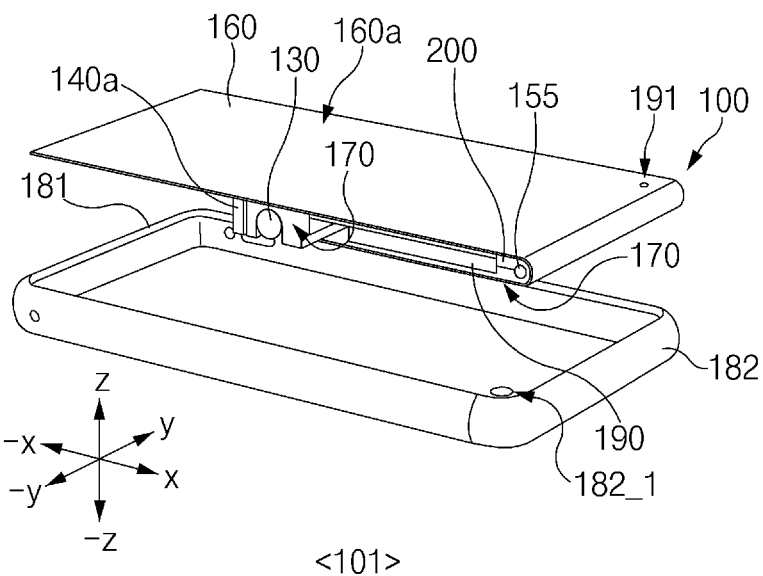
FIG. 2 is a partially exploded perspective view illustrating components of an electronic device according to an embodiment of the disclosure.
Figure 2:
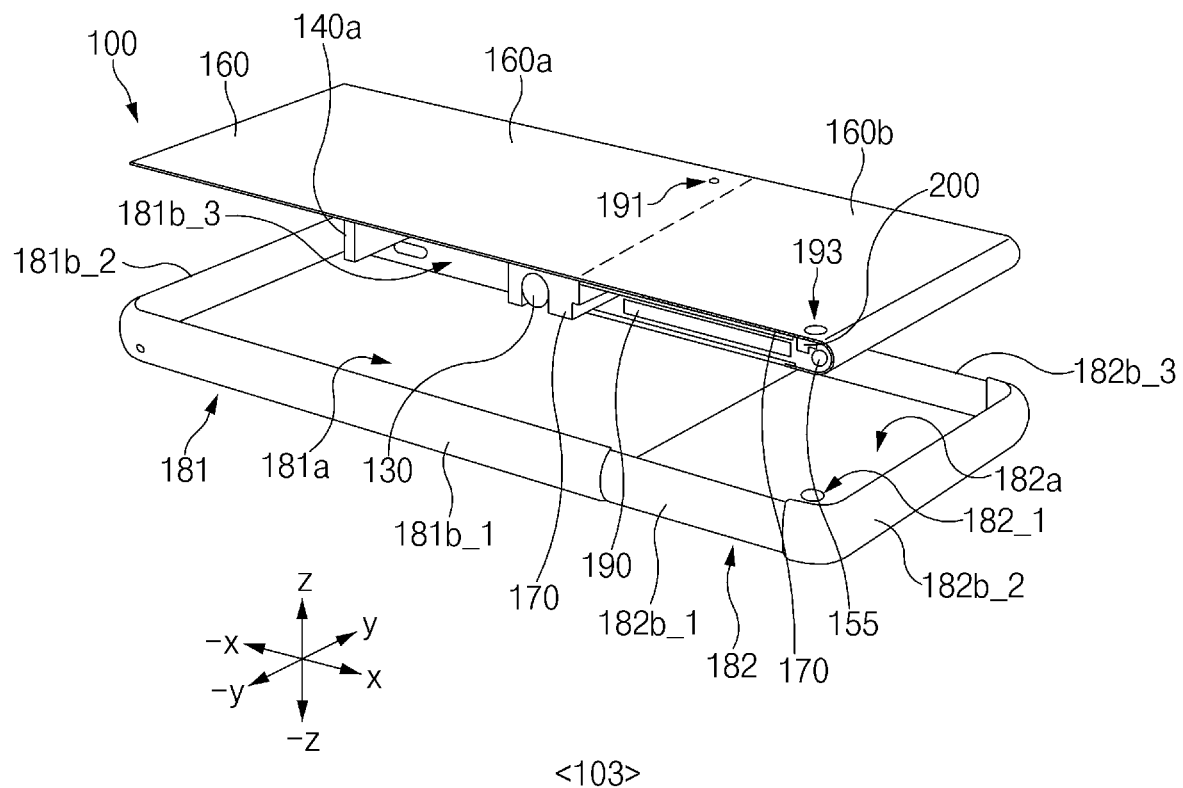

FIG. 2 is a partially exploded perspective view illustrating components of an electronic device according to an embodiment of the disclosure.

Figure 3:
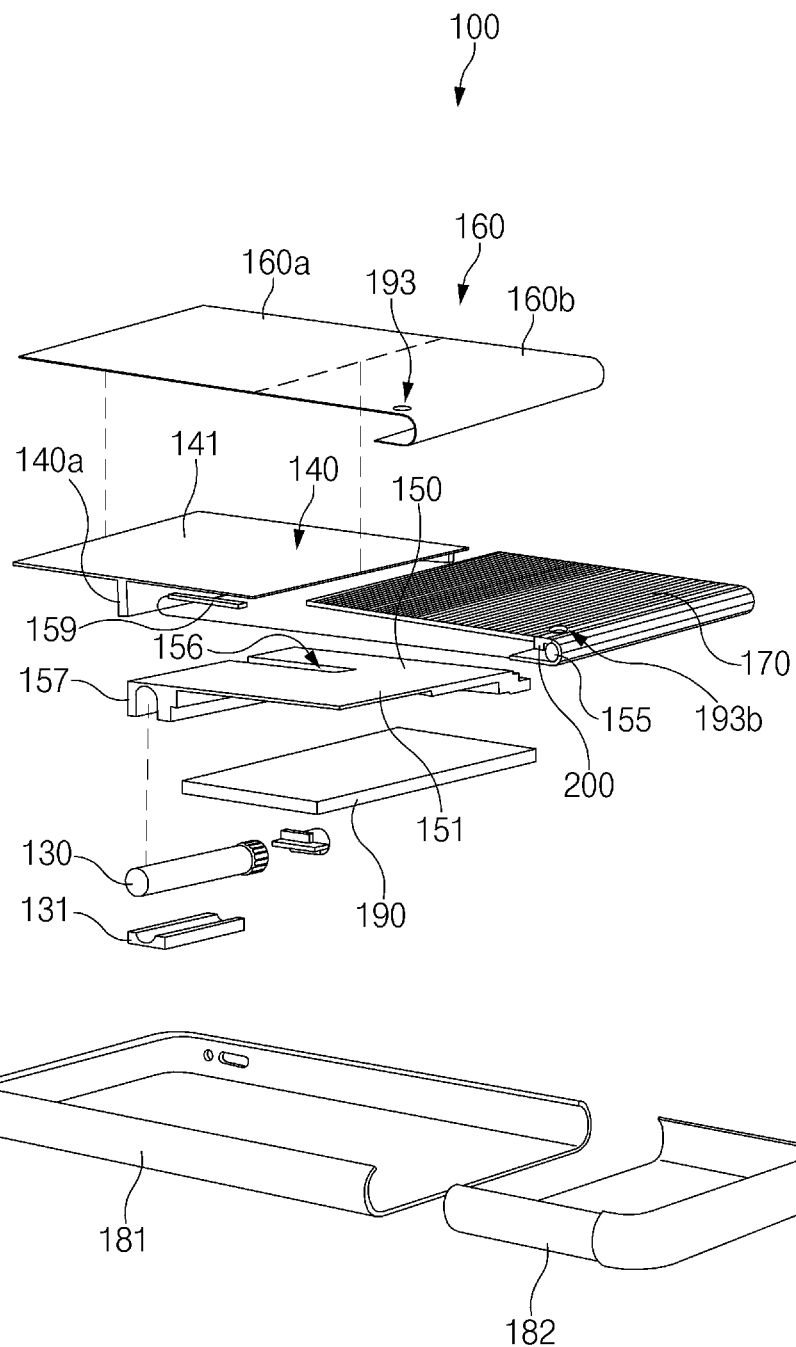
FIG. 3 is an exploded perspective view illustrating components of an electronic device with respect to a first direction according to an embodiment of the disclosure.

FIG. 3 is an exploded perspective view illustrating components of an electronic device with respect to a first direction according to an embodiment of the disclosure.

Figure 4:
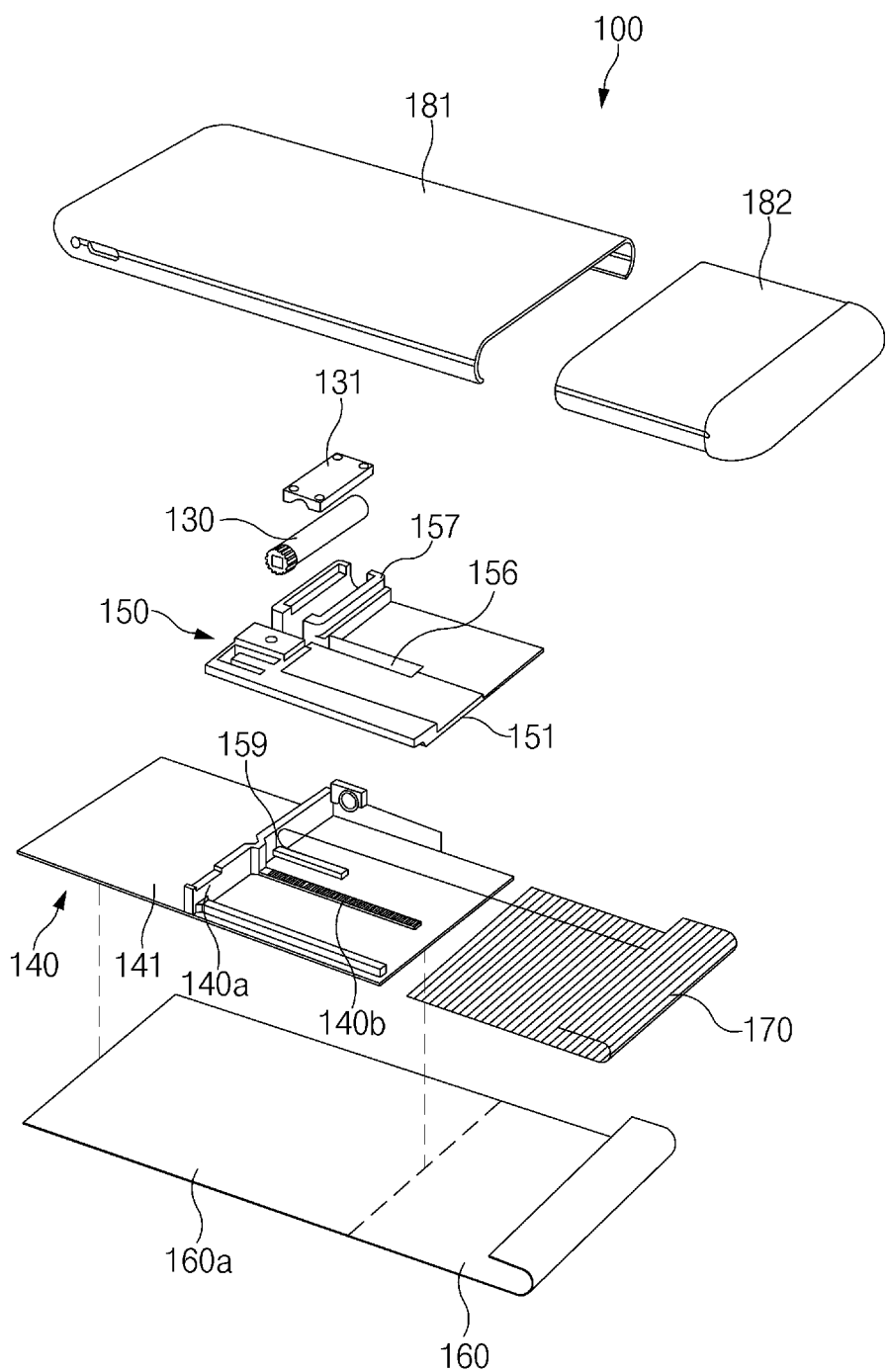
FIG. 4 is an exploded perspective view illustrating components of an electronic device with respect to a second direction according to an embodiment of the disclosure.

FIG. 4 is an exploded perspective view illustrating components of an electronic device with respect to a second direction according to an embodiment of the disclosure.

For example, FIG. 3 is a view illustrating a structure in which the display 160 is disposed on the covers 181 and 182 from the fifth direction (−z-axis direction) to the sixth direction (z-axis direction), and FIG. 4 is a view illustrating a structure in which the covers 181 and 182 and the display 160 are disposed in an opposite direction to that in FIG. 3.

Referring to FIGS. 2 to 4, the electronic device 100 according to the embodiment may include the display 160, a frame 140 (or, a housing or a display support member), a sliding member 150, a panel support part 170, a device component 190, a rotary shaft 155, an actuator module 130 (or, a motor), a case 131, the first cover 181, and the second cover 182.

As described above with reference to FIG. 1, the first cover 181 may include the first bottom portion 181a, the first upper sidewall 181b_1, the second upper sidewall 181b_2, and the third upper sidewall 181b_3 and may be coupled with the second cover 182 in the first direction (x-axis direction) in which no sidewall is formed. The second cover 182 may include the second bottom portion 182a, the first lower sidewall 182b_1, the second lower sidewall 182b_2, and the third lower sidewall 182b_3 and may be coupled with the first cover 181 in the second direction (−x-axis direction) in which no sidewall is formed. The second cover 182 may have a camera hole 182_1 formed on one side of the second bottom portion 182a thereof.

According to an embodiment of the disclosure, the display 160 may include a plurality of pixels disposed in a matrix form, and at least part of the display 160 may be provided in a flexible form. According to an embodiment of the disclosure, the display 160 may include a panel layer that has the plurality of pixels disposed therein and that displays a screen, and an external protection layer disposed over the panel layer. At least part of the external protection layer may be formed of a polymer (e.g., polyimide) or glass. Additionally, the display 160 may further include a touch panel layer. As described above with reference to FIG. 1, the display 160 may include the first display area 160a and the second display area 160b. In the state 101 (e.g., a state before the display area is extended or a state before a sliding operation is performed), at least part of the second display area 160b may be disposed in a rolled state inside the second cover 182. According to various embodiments of the disclosure, in the state 103 (e.g., a state in which the display area is extended or a state in which the sliding operation is performed), at least part of the second display area 160b may be exposed outside the second cover 182. While at least part of the second display area 160b is rolled and bent around the rotary shaft 155 (or, a rolling gear part or a rotary shaft member), another part of the second display area 160b (e.g., part of the second display area 160b that is not exposed outside the second cover 182) may be disposed under the first display area 160a.

One side of the display 160 (e.g., at least part of the second display area 160b) may be disposed inside at least one of the first cover 181 or the second cover 182. In this state, one end of the display 160 or one end of the panel support part 170 that is disposed inside the electronic device 100 may be coupled to an elastic member 159. One side of the elastic member 159 may be fixed to one side of the frame 140, and an opposite side of the elastic member 159 may be connected to the panel support part 170. Accordingly, when the panel support part 170 moves, the elastic force of the elastic member 159 may be increased with a change in the length of the elastic member 159. The elastic force of the elastic member 159 may act to pull one side of the panel support part 170 in the second direction (−x-axis direction).

While the second display area 160b of the display 160 is exposed to the outside, the elastic force of the elastic member 159 may act on the display 160 as a tensile force, and a repulsive force in a bent section of the display 160 (e.g., at least a partial section of the second display area 160b that faces the rotary shaft 155) may be offset. Due to this, a rolled portion of the display 160 may be uniformly maintained.

The frame 140 may have a specified stiffness and may support the display 160. For example, at least part of the frame 140 may be formed of aluminum, aluminum alloy, or stainless steel (SUS), and a surface of the frame 140 that faces the display 160 may include a flat area 141 that is formed to be flat. According to an embodiment of the disclosure, at least part of the frame 140 may be implemented with an injection-molded material (e.g., a structure that contains magnesium). In the state 101, a first surface (e.g., a surface observed in the z-axis direction) of the frame 140 may face a rear surface (e.g., a surface observed in the −z-axis direction) of the first display area 160a, and at least part of a second surface (e.g., a surface observed in the −z-axis direction) of the frame 140 may face an upper surface (e.g., a surface observed in the z-axis direction) of the sliding member 150.

The frame 140 may include a sidewall 140a formed on one side thereof and the flat area 141 that is perpendicular to the sidewall 140a and that supports at least part of the display 160. According to an embodiment of the disclosure, the sidewall 140a may be disposed to protrude from a predetermined position of the flat area 141 in the rear direction (−z-axis direction). Accordingly, the frame 140 may have a section in the shape of "T". The sidewall 140a may be disposed to face one side of the sliding member 150.

At least one rail 140b may be formed on the rear surface (the surface observed in the −z-axis direction) of the frame 140. The rail 140b may have a structure (e.g., a rack gear structure) in which a plurality of protrusions having a predetermined length are continuously disposed on the rear surface of the frame 140. A rotary gear (or, a pinion gear) disposed on one side of the actuator module 130 may be engaged with the rail 140b.

At least part of the sliding member 150 may be disposed under the frame 140, and the sliding member 150 may slide along the rail 140b, which is formed on the frame 140, depending on operation of the actuator module 130. The sliding member 150 may include a base plate 151 disposed to face the frame 140, a motor mounting part 157 formed on the periphery of the base plate 151 (e.g., a portion disposed adjacent to the sidewall 140a of the frame 140 in the state 101), the actuator module 130 mounted in the motor mounting part 157, and the case 131. One end (e.g., an end facing in the first direction (x-axis direction)) of the sliding member 150 may be coupled with the rotary shaft 155. While the sliding member 150 slides in the first direction, the end of the sliding member 150 may rotate the rotary shaft 155, and the panel support part 170 may be moved depending on the rotation of the rotary shaft 155.

The base plate 151 may have a smaller size than the frame 140, and to support the second display area 160b in the state 103 (e.g., a state in which the display area is extended), an upper surface of the base plate 151 may be formed to be flat and may have a size corresponding to the second display area 160b. The base plate 151 may have, in a central portion thereof, a rail hole 156 (or, a rail groove) formed to have a predetermined length and width in the first direction (x-axis direction) such that the actuator module 130 mounted in the motor mounting part 157 and the rail 140b are coupled together. At least part of the base plate 151 may be formed of a material that is the same as, or similar to, the material of the frame 140. At least part of the base plate 151 may be located under the frame 140 in the state 101 and may be slid in the first direction (x-axis direction) from below the frame 140 in the state 103. A gear pattern engaged with the rotary shaft 155 may be provided at an end of the base plate 151.

The motor mounting part 157 may be provided on the bottom of the base plate 151. At least part of the motor mounting part 157 may protrude from a surface of the base plate 151 by a predetermined height and may have a shape corresponding to the shape of the actuator module 130 such that the actuator module 130 is mounted in the motor mounting part 157. The at least part of the motor mounting part 157 may be formed of a material that is the same as, or similar to, the material of the base plate 151.

The actuator module 130 may include a motor that generates power, and the rotary gear disposed at an end of the motor and engaged with the rail 140b. The actuator module 130 may receive power from a battery of the electronic device 100 and may drive the motor under the control of a controller or a processor of the electronic device 100.

The case 131 may be coupled with the motor mounting part 157 while surrounding at least part of the actuator module 130. The case 131 may restrict movement of the actuator module 130 to prevent the actuator module 130 from escaping from the motor mounting part 157. At least part of the actuator module 130 may be disposed in a cavity formed by a coupling of the case 131 and the motor mounting part 157 such that at least part (e.g., the rotary gear) of the actuator module 130 is rotatable.

The rotary shaft 155 (or, the rolling gear part or the rotary shaft member) may have a length similar to the length of one side of the display 160 (e.g., the length of the display 160 in the y-axis direction) and may be disposed such that at least part of the rotary shaft 155 faces the panel support part 170. The rotary shaft 155 may have a cylindrical rod shape. Central portions of opposite side surfaces of the rotary shaft 155 may further protrude beyond peripheral portions of the opposite side surfaces of the rotary shaft 155. The protruding central portions of the opposite side surfaces of the rotary shaft 155 may be mounted on the second cover 182. Accordingly, the rotary shaft 155 may rotate while the second cover 182 is moved in the first direction (x-axis direction). At least part of the rotary shaft 155 may be gear-coupled with the panel support part 170. Alternatively, the rotary shaft 155 may be brought into contact with at least part of the panel support part 170. While the rotary shaft 155 rotates, the arrangement of the panel support part 170 may be changed. For example, while the rotary shaft 155 rotates in a first rotational direction (e.g., the counterclockwise direction), at least part of the panel support part 170 may be moved to an upper surface (a surface observed in the z-axis direction) of the display 160. While the rotary shaft 155 rotates in a second rotational direction (e.g., the clockwise direction), at least part of the panel support part 170 may be moved to a lower surface of the display 160 (or, to between the sliding member 150 and the second cover 182).

The panel support part 170 may be formed in a rail structure in which protrusions having a predetermined length (e.g., a length corresponding to the length of the display 160 in the y-axis direction) are continuously disposed at predetermined intervals. Cross-sections (e.g., cross-sections in the x-axis direction) of the plurality of protrusions may have various shapes, such as a circular shape, an oval shape, a triangular shape, a rhombic shape, a protruding shape, and the like. At least some of the plurality of protrusions may be brought into contact with the surface of the rotary shaft 155 depending on a sliding operation of the electronic device 100. At least some of the plurality of protrusions constituting the panel support part 170 may include a magnetic member or a magnetic body. Furthermore, at least part of the rotary shaft 155 may include a magnetic member or a magnetic body. Accordingly, the panel support part 170, on which the display 160 of the electronic device 100 is seated, may prevent separation of the display 160 (or, may offset a repulsive force by bending of the display 160) by using a magnetic force in a process of being brought into contact with the rotary shaft 155. Accordingly, the degree of flatness of the display 160 around the rotary shaft 155 may be maintained within a specified range.

As described above with reference to FIG. 1, the display 160 may include the first display area 160a disposed on the frame 140 and the second display area 160b, at least part of which is extended or disposed inside the second cover 182 depending on a sliding operation. A first sensor hole 191 related to operation of at least one sensor disposed under the display 160 may be located on one side of the display 160. Furthermore, on an opposite side of the display 160, a second sensor hole 193 related to operation of at least one sensor 200 may be formed through a predetermined area of the display 160. The first sensor hole 191 may be fixedly disposed in the first display area 160a. The second sensor hole 193 may be formed through the second display area 160b. The second sensor hole 193 may face in the front direction (z-axis direction), or may face in the rear direction (−z-axis direction), depending on a change in the position of the second display area 160b.

The device component 190 may include various parts associated with supporting user functions of the electronic device 100. For example, the device component 190 may include a battery, at least one communication circuit, a printed circuit board, a controller or a processor (e.g., a processor 1120 of FIG. 11), and the at least one sensor 200. The at least one sensor 200 may include, for example, at least one of an image sensor (or, a camera) for taking an image, an iris sensor, an illuminance sensor, a proximity sensor or a proximity illuminance sensor, or a biometric sensor, such as a fingerprint sensor or a heart rate sensor. According to an embodiment of the disclosure, an illuminance sensor may be disposed under the first sensor hole 191, and an image sensor may be disposed under the second sensor hole 193. The illuminance sensor and the image sensor may be mounted on the printed circuit board included in the device component 190. The at least one sensor 200 included in the device component 190 may be disposed under the first sensor hole 191 or the second sensor hole 193. According to an embodiment of the disclosure, an image sensor (or, a camera) may be disposed under the second sensor hole 193.

According to various embodiments of the disclosure, at least part of the panel support part 170 and at least part of the display 160 may include a through-hole or a transparent layer and may be disposed such that the sensor 200 obtains a sensor signal (e.g., an optical signal for taking an image) from the outside depending on a sliding operation of the electronic device 100.

Figure 5:
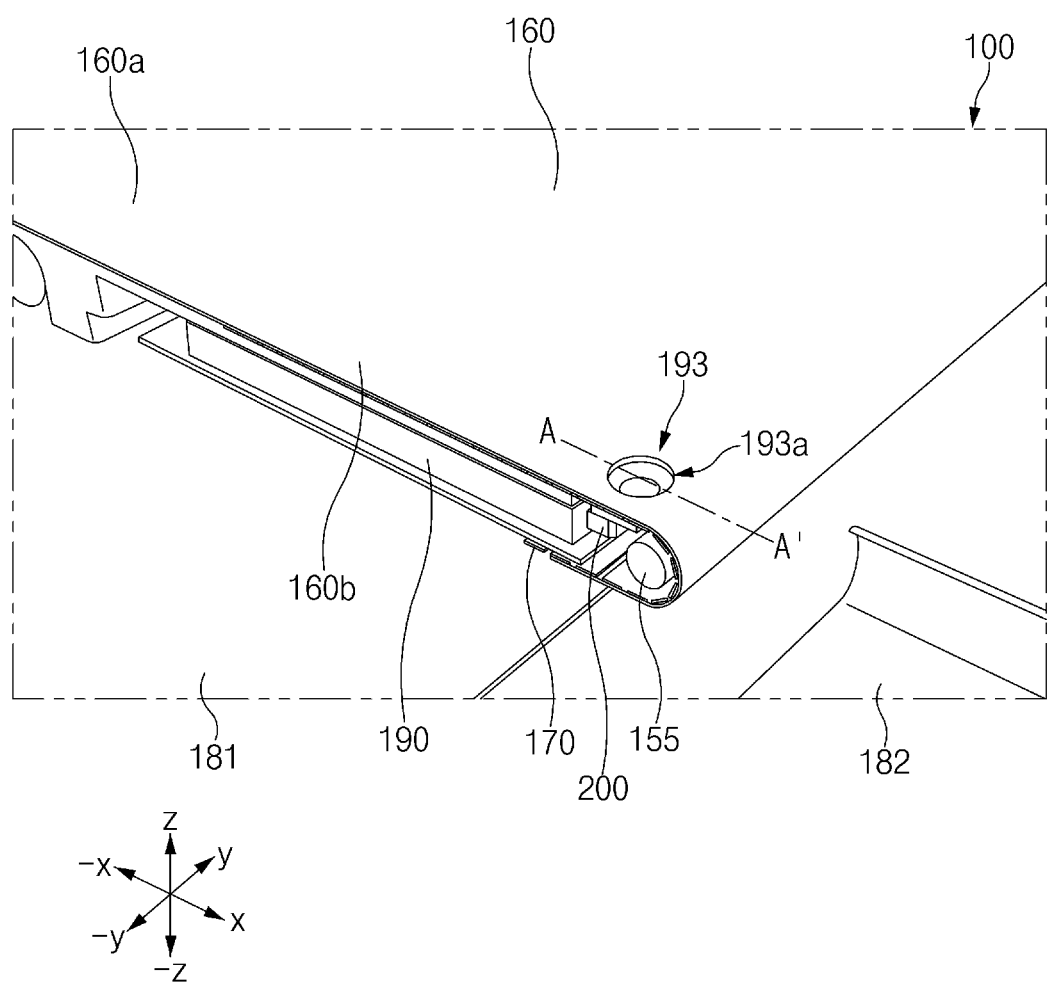
FIG. 5 is a view illustrating some components of an electronic device including a display according to an embodiment of the disclosure.

FIG. 5 is a view illustrating some components of an electronic device including a display according to an embodiment of the disclosure.

Figure 6:
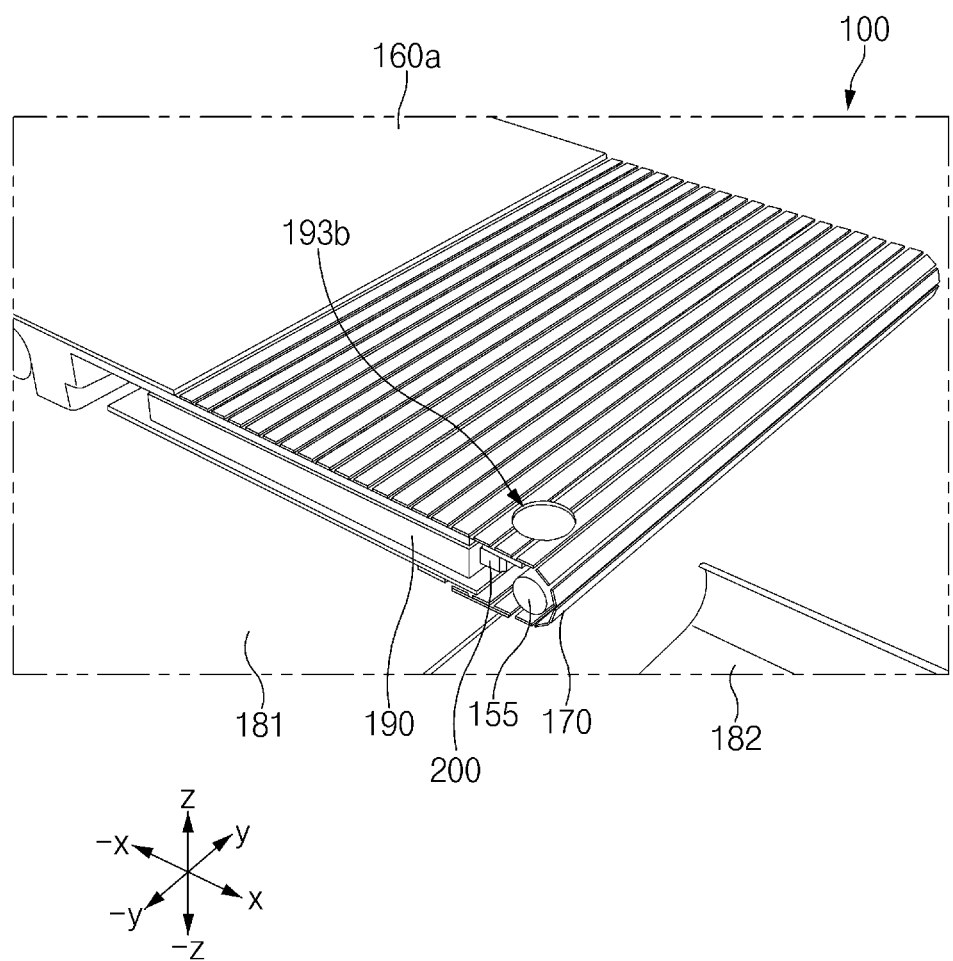
FIG. 6 is a view illustrating some components of an electronic device from which a display is removed according to an embodiment of the disclosure.

FIG. 6 is a view illustrating some components of an electronic device from which a display is removed according to an embodiment of the disclosure.

Referring to FIGS. 5 and 6, the electronic device 100 may include the first cover 181, the second cover 182, the display 160, the rotary shaft 155, the device component 190, the panel support part 170, and the sliding member 150. As described above with reference to FIGS. 2 to 4, the electronic device 100 may further include components, such as the frame 140 and the actuator module 130.

The first cover 181 and the second cover 182 may have a structure that is open at one side and that includes three sidewalls and a bottom portion. The first cover 181 and the second cover 182 may be coupled with each other, and a specific one of the first and second covers 181 and 182 may slide relative to the other cover. The rotary shaft 155 may face or make contact with at least part of the panel support part 170 and may perform rotary motion. The arrangement of the panel support part 170 may be changed depending on the rotary motion of the rotary shaft 155. For example, at least part of the panel support part 170 may be moved in the front direction (z-axis direction) of the display 160 in response to a first rotary motion of the rotary shaft 155 and may be moved in the rear direction (−z-axis direction) of the display 160 in response to a second rotary motion of the rotary shaft 155.

As described above with reference to FIGS. 2 to 4, the device component 190 may include various electronic parts associated with driving the electronic device 100. For example, the device component 190 may include the at least one sensor 200. The at least one sensor 200 may include at least one of an image sensor (or, a camera) for taking an image, an iris sensor, an illuminance sensor, a proximity sensor or a proximity illuminance sensor, or a biometric sensor, such as a fingerprint sensor or a heart rate sensor. The arrangement or position of the at least one sensor 200 included in the device component 190 may be fixed. For example, the at least one sensor 200 may be disposed to face in the z-axis direction.

The state of the display 160 or the panel support part 170 illustrated in FIGS. 5 and 6 may include a state (e.g., the state 103 of FIG. 1) in which the electronic device 100 completely performs a sliding operation to extend the area of the display 160. Referring to FIGS. 5 and 6, a first hole 193a (or, a display hole or a transparent area) related to operation of a sensor may be formed on one side of the display 160. Furthermore, a second hole 193b (or, a panel hole or a transparent area) related to operation of a sensor may be formed on one side of the panel support part 170. The first hole 193a and the second hole 193b may be disposed to overlap each other in the z-axis direction and may constitute the second sensor hole 193. Accordingly, the second sensor hole 193 may be formed through a predetermined area of the display 160 and a predetermined area of the panel support part 170.

The panel support part 170 may be disposed on one side of the display 160 (e.g., under the second display area 160b), and the display 160 may be disposed such that the first display area 160a and the second display area 160b face in the front direction (z-axis direction). The second sensor hole 193 (e.g., the hole in which the first hole 193a and the second hole 193b overlap each other) that is located on one side of the second display area 160b may be disposed to face in the front direction (z-axis direction).

As the second sensor hole 193 is disposed to face in the front direction (z-axis direction), the at least one sensor 200 disposed under the display 160 may collect a sensor signal (e.g., an optical signal or an ultrasonic signal) through at least part of the second sensor hole 193. According to various embodiments of the disclosure, the at least one sensor 200 may include a camera, and the electronic device 100 may take an image of the outside through the second sensor hole 193. Alternatively, the at least one sensor 200 may include a biometric sensor (e.g., a fingerprint sensor), and the electronic device 100 may obtain fingerprint information through at least part of the second sensor hole 193.

Figure 7:
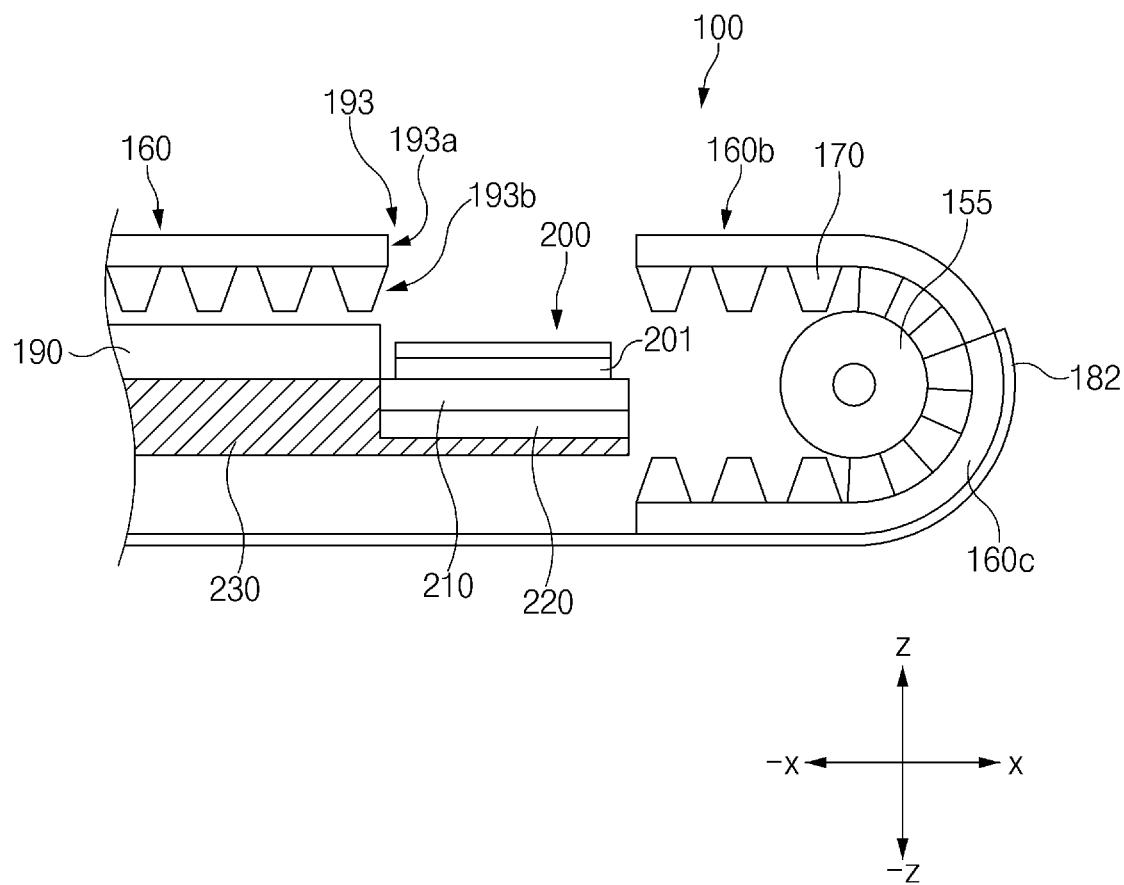
FIG. 7 is a view illustrating a section taken along line A-A' illustrated in FIG. 5 according to an embodiment of the disclosure.

FIG. 7 is a view illustrating a section taken along line A-A' illustrated in FIG. 5 according to an embodiment of the disclosure.

Referring to FIG. 7, the electronic device 100 according to an embodiment may include the second cover 182, the panel support part 170 at least partially disposed inside the second cover 182, the rotary shaft 155, the display 160 disposed on the panel support part 170, and the device component 190 having the sensor 200 disposed therein. The area of the display 160 illustrated in FIG. 7 may include, for example, part of the second display area 160b. The panel support part 170 may include a structure in which protrusions are continuously disposed at predetermined intervals. Part of the display 160 may be disposed on at least part of the panel support part 170, and as the at least part of the panel support part 170 is bent while being brought into contact with the rotary shaft 155, the part of the display 160 may be bent. While the second display area 160b is exposed to the outside after a sliding operation of the electronic device 100 is completed, a non-display area 160c adjacent to the second display area 160b may be hidden by at least part of the second cover 182. At least one of a wire, a pad, or a driver chip associated with driving the display 160 may be disposed on the non-display area 160c. The device element 190 may include at least one component associated with driving the electronic device 100. For example, the device component 190 may include a processor, a memory, and a communication chip and may include a printed circuit board 230 on which the processor, the memory, and the communication chip are mounted.

The at least one sensor 200 may be mounted on one side of the printed circuit board 230. The at least one sensor 200 may collect a sensor signal (e.g., an optical signal associated with obtaining an image) in the front direction (z-axis direction). The at least one sensor 200 may include, for example, a camera. In a case where the at least one sensor 200 is a camera, the at least one sensor 200 may include a lens module 201, an image sensor array 210, and a support part 220. The lens module 201 may include at least one lens, a lens barrel surrounding the lens, a diaphragm, an optical image stabilization module, and the like. The image sensor array 210, which is a memory for storing light collected through the lens module 201, may convert obtained light into digital information and may provide the digital information to the processor through the printed circuit board 230. The support part 220 may be disposed on a rear surface of the image sensor array 210 and may support the image sensor array 210. At least part of the support part 220 may be formed of a metallic material. According to various embodiments of the disclosure, in a case where the at least one sensor 200 is a proximity sensor, the at least one sensor 200 may include a transmitting part that transmits a sensor signal, a receiving part that receives a reflected signal corresponding to the transmitted signal, an IC that controls the transmission of the signal and processes the received signal, and a circuit board that supports the IC. The circuit board may be electrically connected with the printed circuit board 230.

The second hole 193*b* may be provided on one side of the panel support part 170, and the first hole 193*a* may be provided in the display 160 disposed on the panel support part 170. The first hole 193*a* and the second hole 193*b* may overlap each other to form the second sensor hole 193. At least part of the at least one sensor 200 may be aligned with the second sensor hole 193, and the at least one sensor 200 may collect a sensor signal through the second sensor hole 193. The second sensor hole 193 may have a size equal to or larger than the size of at least part of the at least one sensor 200. According to an embodiment of the disclosure, the second sensor hole 193 may have a larger size than the lens included in the lens module 201. In the illustrated drawing, the electronic device 100 may correspond to a state (e.g., the state 103 of FIG. 1) in which the sliding operation is completed such that the second display area 160*b* faces in the front direction (z-axis direction). When the electronic device 100 operates in contrast to the initial sliding operation such that the second display area 160*b* faces in the rear direction (−z-axis direction), a display area (e.g., the second display area 160*b*) including the second sensor hole 193 may be moved into the second cover 182. At this time, the device component 190 may be moved in the second direction (−x-axis direction).

When a sliding operation is completed and the second sensor hole 193 is aligned with at least part of the at least one sensor 200, the processor included in the electronic device 100 may automatically control the supply of power to the at least one sensor 200 and may activate a camera function. When a sliding operation is oppositely performed (e.g., when a sliding operation is performed such that the second display area 160*b* is moved into the second cover 182), the processor may interrupt the supply of power to the at least one sensor 200 and may deactivate the camera function. For example, when a user input for requesting a sliding operation occurs, the processor of the electronic device 100 may activate the at least one sensor 200 and may output, on the display 160, a camera execution screen depending on the activation of the sensor 200. When a user input for requesting a sliding restoration operation occurs, the processor of the electronic device 100 may perform control to deactivate the at least one sensor 200, terminate the camera execution screen, and output a specified screen (e.g., a standby screen, a home screen, or the screen performed right before the camera function execution screen) on the display 160. In this regard, the electronic device 100 may provide a physical button or an icon related to sliding operation control for extending the area of the display 160 and may perform the sliding operation control when the corresponding physical button or icon is touched.

Figure 8:
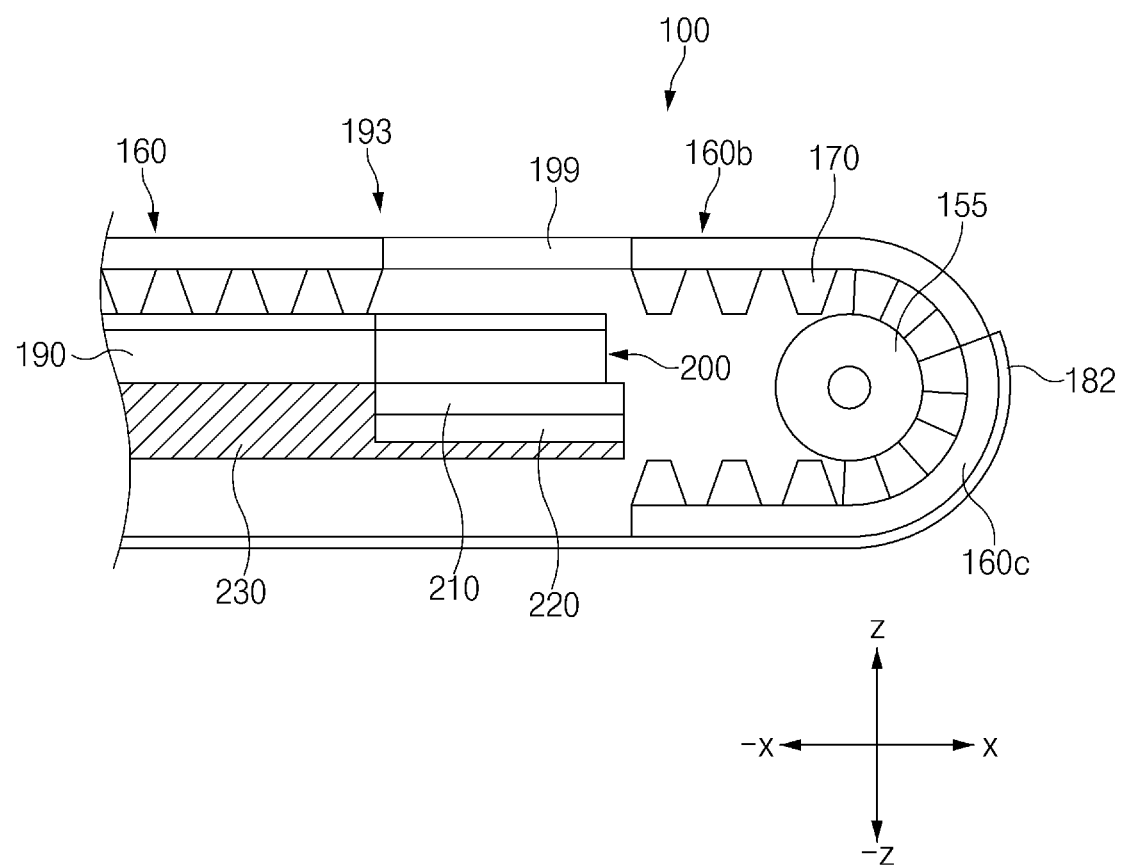
FIG. 8 is a view illustrating a section taken along line A-A' illustrated in FIG. 5 according to an embodiment of the disclosure.

FIG. 8 is a view illustrating a section taken along line A-A' illustrated in FIG. 5 according to an embodiment of the disclosure.

Referring to FIG. 8, similarly to that illustrated in FIG. 7, the electronic device 100 according to an embodiment may include the second cover 182, the panel support part 170, the rotary shaft 155, the display 160, and the device component 190 having the sensor 200 disposed therein.

The electronic device 100 including the aforementioned components may further include a protection member, for example, a transparent protection member 199 that fills at least part of the first hole 193*a* formed in the display 160. According to various embodiments of the disclosure, an adhesive member may be disposed between the protection member 199 and at least part of the second sensor hole 193, and the protection member 199 may be fixed to the second sensor hole 193 by the adhesive member. According to various embodiments of the disclosure, only the area of the display 160 that corresponds to the first hole 193*a* may be formed of a transparent display. Alternatively, at least part of the second display area 160*b* that includes the first hole 193*a* may be formed of a transparent display.

The transparent protection member 199 may prevent infiltration of foreign matter or moisture through the first hole 193*a*. The transparent protection member 199 may prevent physical damage to the at least one sensor 200 by external pressure or an object. The transparent protection member 199 may have a specified transparency or more to enable the at least one sensor 200 to take an image or collect a sensor signal. In a case where the at least one sensor 200 is a sensor (e.g., a proximity illuminance sensor) that has a lower resolution than a sensor requiring a high resolution to take an image or transmits and receives a signal including noise with a specified magnitude or less, the protection member 199 may be formed of a material enabling transmission or collection of a specified signal irrespective of transparency.

The transparent protection member 199 may be formed in a shape (e.g., a circular shape or an oval shape) that corresponds to the shape of the first hole 193*a*. The transparent protection member 199 may be formed of, for example, at least one of an acrylic material, glass, or a polymer. An upper surface of the transparent protection member 199 may be formed at the same height as the adjacent upper surface of the display 160. For example, the boundary of the transparent protection member 199 and the boundary of the first hole 193*a* of the display 160 may be maintained at the same height, thereby providing continuous texture.

According to various embodiments of the disclosure, the transparent protection member 199 may have a thickness to fill the first hole 193*a*. Alternatively, the transparent protection member 199 may have a thickness that is the same as, or similar to, the thickness of the display 160. According to various embodiments of the disclosure, the transparent protection member 199 may have a thickness to fill the first hole 193*a* and the second hole 193*b*. Alternatively, the transparent protection member 199 may have a thickness corresponding to the height by which the display 160 and the panel support part 170 overlap each other. The transparent protection member 199 may be bent around the rotary shaft 155 in response to a sliding operation of the electronic device 100. Therefore, at least part of the transparent protection member 199 may be formed of a flexible material.

According to various embodiment of the disclosure s, the transparent protection member 199 may be a component of the display 160. In this case, all or at least part of the display 160 may be formed of a transparent display. For example, the first display area 160a may be formed of an opaque display, and the second display area 160b may be formed of a transparent display. According to various embodiments of the disclosure, the transparent protection member 199 may be formed in at least one of the first hole 193a or the second hole 193b. For example, the transparent protection member 199 may include a first protection member disposed in the first hole 193a and a second protection member disposed in the second hole 193b.

Figure 9:
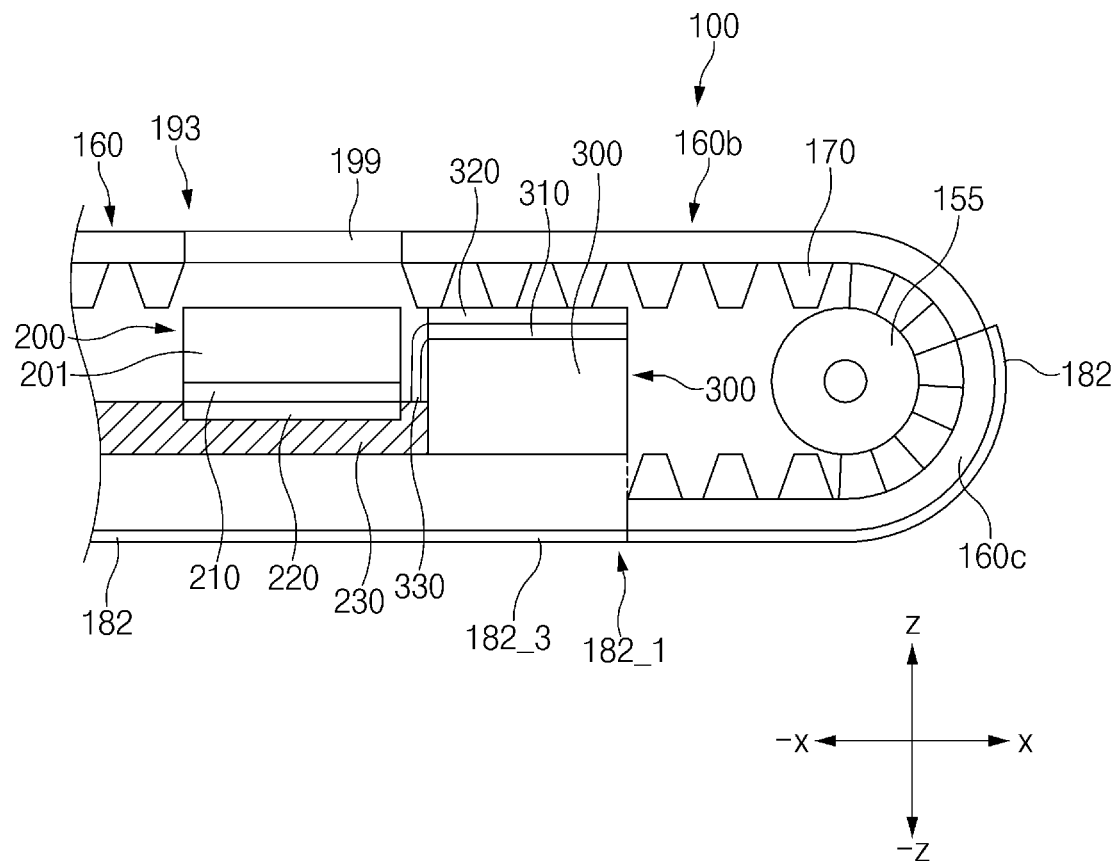
FIG. 9 is a view illustrating a section taken along line A-A' illustrated in FIG. 5 according to an embodiment of the disclosure.

FIG. 9 is a view illustrating a section taken along line A-A' illustrated in FIG. 5 according to an embodiment of the disclosure.

Referring to FIG. 9, the electronic device 100 according to an embodiment may include the second cover 182, the panel support part 170, the rotary shaft 155, the display 160, and the device component 190 having a plurality of sensors 200 and 300 disposed therein.

The plurality of sensors 200 and 300 may include, for example, the first sensor 200 mounted on one side of the printed circuit board 230 included in the device component 190 and the second sensor 300 disposed adjacent to the first sensor 200. The second sensor 300 may be mounted on the printed circuit board 230 similarly to the first sensor 200, or may be electrically connected to the printed circuit board 230 through a wire 330 (e.g., a flexible printed circuit board (FPCB)) while being bonded to the first sensor 200. In the drawing, the wire 330 is illustrated as being disposed between the first sensor 200 and the second sensor 300 and electrically connected to the printed circuit board 230. However, the disclosure is not limited thereto. For example, a surface of the first sensor 200 that faces in the first direction (x-axis direction) and a surface of the second sensor 300 that faces in the second direction (−x-axis direction) may be bonded in a state of being brought into contact with each other, and the first sensor 200 may be electrically connected to the printed circuit board 230 using the wire 330 through a surface of the second sensor 300 that faces in a different direction (e.g., a surface facing in a direction different from the second direction (−x-axis direction)). The first sensor 200 may include a front camera, and the second sensor 300 may include a rear camera. In this case, the first sensor 200 may include the first lens module 201, the first image sensor array 210, and the first support part 220. The second sensor 300 may include a second lens module 301, a second image sensor array 310, a second support part 320, and the wire 330. The second image sensor array 310 may be electrically connected to the printed circuit board 230 through the wire 330. The first support part 220 and the second support part 320 may support the lens modules 201 and 301. In this regard, at least part of at least one of the first support part 220 or the second support part 320 may have a specified stiffness or more (e.g., the stiffness of a metallic material).

When a sliding operation is performed in an initial state in which at least part of the second display area 160b is disposed inside the second cover 182, at least part of the panel support part 170 may be moved relative to the rotary shaft 155 to face in the front direction (z-axis direction). Accordingly, the at least part of the second display area 160b disposed on the panel support part 170 may face in the front direction (z-axis direction). At least part of the second sensor hole 193 formed through the panel support part 170 and the display 160 may be aligned with the first sensor 200. The first sensor 200 may collect a sensor signal through the second sensor hole 193. As described above with reference to FIG. 8, the first transparent protection member 199 may be disposed in the second sensor hole 193.

The second sensor 300 may be disposed to face in the rear direction (−z-axis direction) and may collect a sensor signal in the rear direction (−z-axis direction). In this regard, at least part of the second sensor 300 may be aligned with the camera hole 182_1 provided on one side of the second cover 182. The camera hole 182_1 may be formed by removing part of the second cover 182. A second transparent protection member 182_3 may be disposed in the camera hole 182_1. The second transparent protection member 182_3 may be formed of at least one of glass, an acrylic material, or a polymer. The second transparent protection member 182_3 may have a transparency enabling acquisition of an image having a specified resolution or more through the second sensor 300. In a state before the sliding operation is performed (e.g., the state 101 of FIG. 1) and a state after the sliding operation is performed (e.g., the state 103 of FIG. 1), the camera hole 182_1 may remain aligned with the second sensor 300. Accordingly, irrespective of the state 101 or the state 103, the electronic device 100 may take an image in the rear direction (−z-axis direction) by using the second sensor 300.

When receiving a user input signal for requesting activation of a camera function (e.g., a user input signal for selecting an icon related to the camera function) in the state before the sliding operation or in the state 101 of FIG. 1, the processor of the electronic device 100 may perform control to activate the second sensor 300 and to output, on the display 160, a preview screen obtained through the second sensor 300. When receiving a user input signal for requesting activation of a camera function (e.g., a user input signal for selecting an icon related to the camera function) in the state after the sliding operation or in the state 103 of FIG. 1, the processor of the electronic device 103 may perform control to activate the first sensor 200 and to output, on the display 160, a preview screen obtained through the first sensor 200. According to various embodiments of the disclosure, when receiving a user input signal for requesting activation of a camera function (e.g., a user input signal for selecting an icon related to the camera function) in the state before the sliding operation or in the state 101 of FIG. 1, the processor of the electronic device 100 may perform control to activate both the first sensor 200 and the second sensor 300 and to output, on the display 160, a first preview screen obtained through the first sensor 200 and a second preview screen obtained through the second sensor 300. In this operation, the processor may perform control to divide the screen of the display 160 into two screens and output the first preview screen and the second preview screen on the two screens, respectively, or output the first preview screen as a full screen and output the second preview screen as a thumbnail screen or a screen smaller than the full screen through a picture in picture (PIP) method.

According to various embodiments of the disclosure, in the state 101, at least part of the second sensor hole 193 of the electronic device 100 may be aligned with the camera hole 182_1. The second sensor 300 may be separated from the first sensor 200 and may be connected to the printed circuit board 230 through the wire 330. In this structure, the first sensor 200, together with the device component 190, may be moved in the second direction (−x-axis direction) depending on a sliding restoration operation (e.g., an operation for a state in which the second cover 182 and the first cover 181 overlap each other to the maximum so as to return to the state before the display area is extended). At this time, the second sensor 300 may be fixed in a position adjacent to the rotary shaft 155. In the state 101, the second sensor 300 may obtain an image of an external subject through the second sensor hole 193 and the camera hole 182_1.

Figure 10:
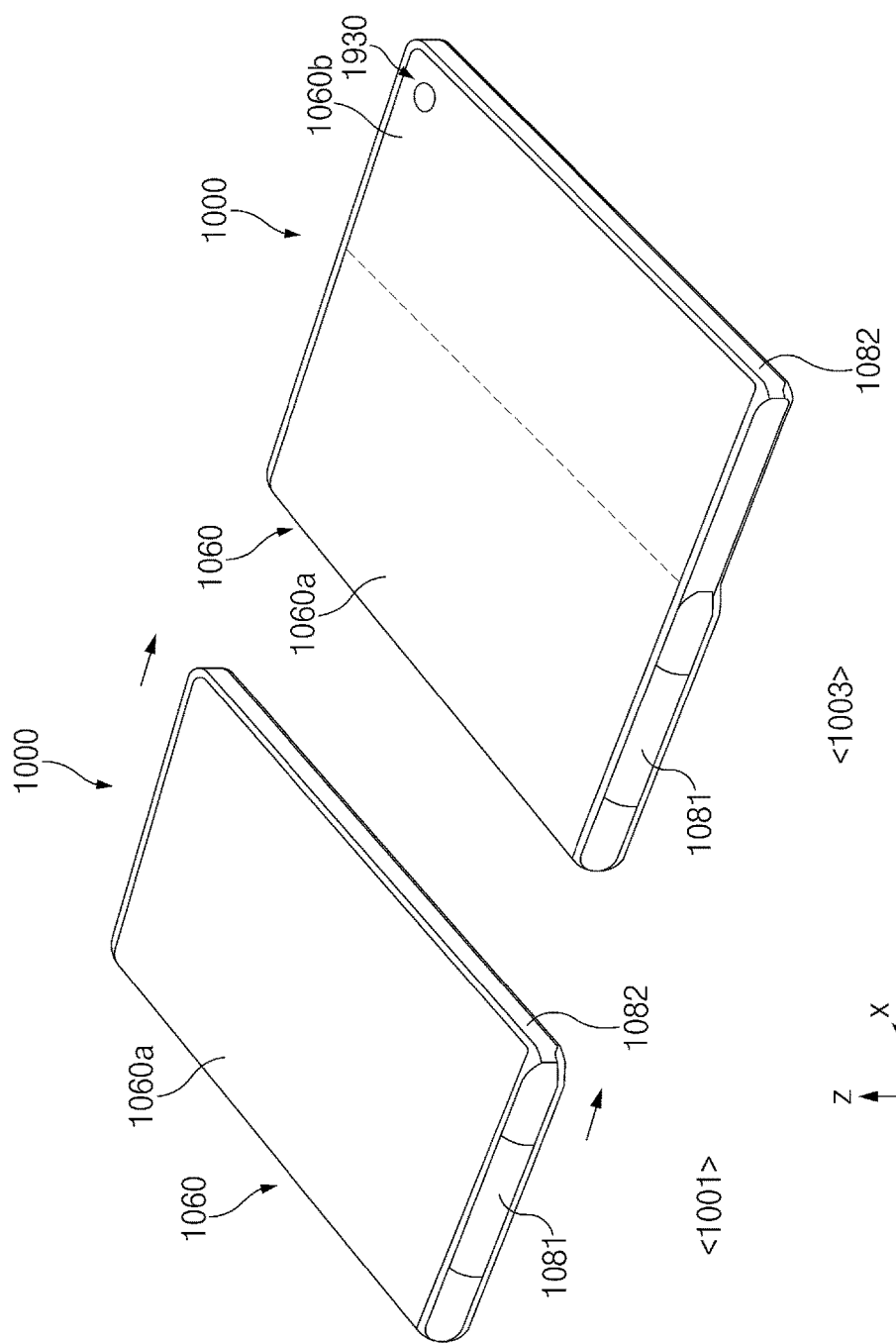
FIG. 10 is a view illustrating an electronic device according to an embodiment of the disclosure.

FIG. 10 is a view illustrating an electronic device according to an embodiment of the disclosure.

Referring to FIG. 10, an electronic device 1000 according to an embodiment may include a first cover 1081 and a second cover 1082 and may include a display 1060 disposed inside the first cover 1081 and the second cover 1082. In a state 1001 (e.g., a state before a sliding operation is performed in a third direction (y-axis direction) in relation to extension of a display area), the display 1060 may be disposed such that a first display area 1060a faces in a front direction (z-axis direction). In the state 1001, at least part of a second display are 1060b may be disposed, for example, inside the second cover 1082 and may not be exposed to the outside.

In a state 1003 (e.g., a state after the sliding operation is performed in the third direction (y-axis direction) in relation to the extension of the display area), the display 1060 may be disposed such that the first display area 1060a and the second display area 1060b face in the front direction (z-axis direction). As the second display area 1060b is disposed to face in the front direction (z-axis direction), a sensor hole 1930 located in the second display area 1060b may face in the front direction (z-axis direction). A camera related to collection of images may be disposed under the sensor hole 1930. The camera may collect images through the sensor hole 1930. When the electronic device 1000 is changed from the state 1003 to the state 1001, the second display area 1060b may be moved into the second cover 1082. Accordingly, the sensor hole 1930 may also be moved into the second cover 1082.

As described above, the sensor related structure according to the embodiment of the disclosure may be identically applied to the electronic device of the horizontal sliding type (e.g., a type in which at least part of an electronic device slides in the y-axis direction and the −y-axis direction) as well as the electronic device of the vertical sliding type described above with reference to FIGS. 1 to 9 (e.g., a type in which at least part of an electronic device slides in the x-axis direction and −x-axis direction).

According to the various embodiments described above, an electronic device 100 according to an embodiment may include a first cover 181, a second cover 182 that is coupled with the first cover and that performs a sliding operation, a display 160, an exposed area of which is changed in size in response to the sliding operation of the second cover, a panel support part 170 disposed on one side of a rear surface of the display with respect to a front surface of the display on which a screen is displayed, a rotary shaft 155 that makes contact with at least part of the panel support part and rotates in response to the sliding operation of the second cover, a hole 193b exposed in response to the sliding operation of the second cover, and a sensor 200, at least part of which is disposed under the hole.

According to various embodiments of the disclosure, the sensor may include a camera that obtains an image through the hole.

According to various embodiments of the disclosure, the electronic device may further include a protection member disposed in the hole.

According to various embodiments of the disclosure, the protection member may have a specified transparency.

According to various embodiments of the disclosure, at least part of the protection member may be formed of a flexible material.

According to various embodiments of the disclosure, the hole may include a first hole formed through one side of the display and a second hole formed through one side of the panel support part.

According to various embodiments of the disclosure, at least part of the first hole and at least part of the second hole may be disposed to be aligned with each other in an up/down direction.

According to various embodiments of the disclosure, the electronic device may further include a transparent protection member that is disposed in the first hole and that has a specified transparency.

According to various embodiments of the disclosure, the hole may be moved into the second cover in response to a sliding restoration operation of the second cover for reducing an extended area of the display in a state in which a sliding operation of the second cover related to extension of an area of the display is performed.

According to various embodiments of the disclosure, the display may include a display hole 193a formed in an area corresponding to the hole, or a transparent area.

In this case, the display may include a first display area 160a and a second display area 160b that is continuous with the first display area, at least part of the second display area being exposed to the outside depending on a sliding operation of the second cover related to extension of an area of the display, and the display hole may be disposed in the second display area.

According to various embodiments of the disclosure, the electronic device may further include an actuator module 130 that generates power related to the sliding operation of the second cover and a processor operatively connected with the actuator module.

According to various embodiments of the disclosure, the processor may perform control to perform the sliding operation by operating the actuator module in response to a user input.

According to various embodiments of the disclosure, the processor may perform control to automatically activate the sensor, when receiving a user input for requesting a sliding operation of the second cover related to extension of an area of the display.

According to various embodiments of the disclosure, the processor may perform control to output, on the display, a preview image obtained through the sensor.

According to various embodiments of the disclosure, the processor may control the actuator module to perform a sliding operation of the second cover related to extension of an area of the display, when receiving a user input related to activation of the sensor.

According to various embodiments of the disclosure, the processor may perform control to output, on the display, an icon related to activation of the sensor and may control the actuator module to perform a sliding operation of the second cover related to extension of an area of the display, when receiving a user input related to selection of the icon.

According to various embodiments of the disclosure, the processor may control the actuator module to perform a sliding restoration operation of the second cover related to reduction of an area of the display, when receiving a user input for making a request to terminate an application related to operation of the sensor.

According to various embodiments of the disclosure, the processor may perform control to deactivate the sensor, when receiving a user input for requesting a sliding restoration operation of the second cover related to reduction of an area of the display.

According to various embodiments of the disclosure, the processor may perform control to automatically terminate an application related to operation of the sensor, when receiving a user input for requesting a sliding restoration operation of the second cover related to reduction of an area of the display.

According to various embodiments of the disclosure, the electronic device may further include a processor operatively connected with the sensor, and the processor may perform control to automatically activate an application related to the sensor, when a sliding operation of the second cover related to extension of an area of the display is detected and may perform control to automatically terminate an application related to the sensor, when a sliding operation of the second cover related to reduction of an area of the display is detected. In this regard, the electronic device may further include a sensor or a switch that senses the sliding operation (or, the sliding restoration operation) of the second cover, and the sensor or the switch may provide, to the processor, a signal depending on a sliding operation change.

Figure 11:
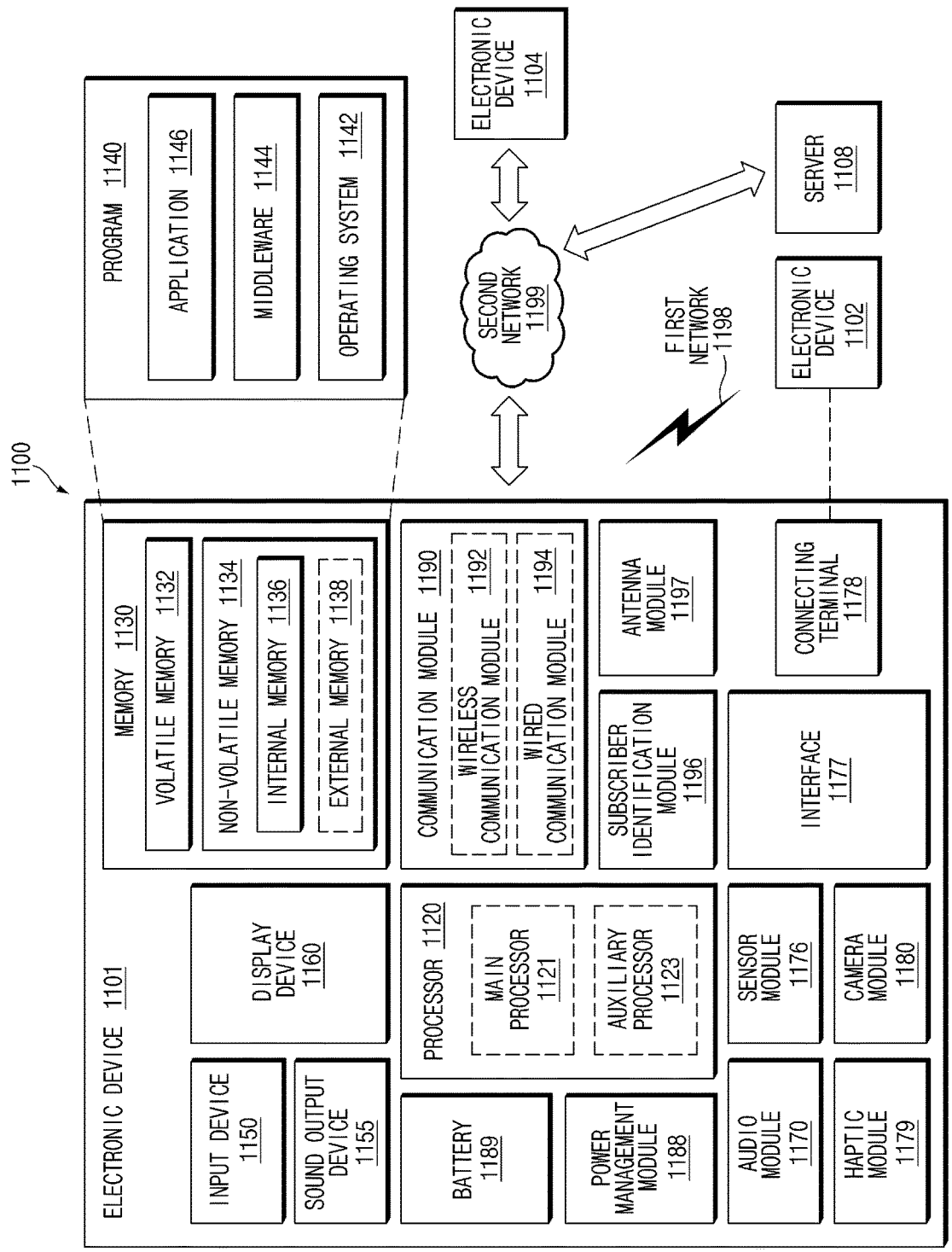
FIG. 11 is a block diagram illustrating an electronic device in a network environment according to an embodiment of the disclosure.

FIG. 11 is a block diagram illustrating an electronic device in a network environment according to an embodiment of the disclosure.

Referring to FIG. 11, an electronic device 1101 in a network environment 1100 may communicate with an electronic device 1102 via a first network 1198 (e.g., a short-range wireless communication network), or an electronic device 1104 or a server 1108 via a second network 1199 (e.g., a long-range wireless communication network). According to an embodiment of the disclosure, the electronic device 1101 may communicate with the electronic device 1104 via the server 1108. According to an embodiment of the disclosure, the electronic device 1101 may include a processor 1120, memory 1130, an input device 1150, a sound output device 1155, a display device 1160, an audio module 1170, a sensor module 1176, an interface 1177, a haptic module 1179, a camera module 1180, a power management module 1188, a battery 1189, a communication module 1190, a subscriber identification module (SIM) 1196, or an antenna module 1197. In some embodiments of the disclosure, at least one (e.g., the display device 1160 or the camera module 1180) of the components may be omitted from the electronic device 1101, or one or more other components may be added in the electronic device 1101. In some embodiments of the disclosure, some of the components may be implemented as single integrated circuitry. For example, the sensor module 1176 (e.g., a fingerprint sensor, an iris sensor, or an illuminance sensor) may be implemented as embedded in the display device 1160 (e.g., a display).

The processor 1120 may execute, for example, software (e.g., a program 1140) to control at least one other component (e.g., a hardware or software component) of the electronic device 1101 coupled with the processor 1120, and may perform various data processing or computation. According to one embodiment of the disclosure, as at least part of the data processing or computation, the processor 1120 may load a command or data received from another component (e.g., the sensor module 1176 or the communication module 1190) in volatile memory 1132, process the command or the data stored in the volatile memory 1132, and store resulting data in non-volatile memory 1134. According to an embodiment of the disclosure, the processor 1120 may include a main processor 1121 (e.g., a central processing unit (CPU) or an application processor (AP)), and an auxiliary processor 1123 (e.g., a graphics processing unit (GPU), an image signal processor (ISP), a sensor hub processor, or a communication processor (CP)) that is operable independently from, or in conjunction with, the main processor 1121. Additionally or alternatively, the auxiliary processor 1123 may be adapted to consume less power than the main processor 1121, or to be specific to a specified function. The auxiliary processor 1123 may be implemented as separate from, or as part of the main processor 1121.

The auxiliary processor 1123 may control at least some of functions or states related to at least one component (e.g., the display device 1160, the sensor module 1176, or the communication module 1190) among the components of the electronic device 1101, instead of the main processor 1121 while the main processor 1121 is in an inactive (e.g., sleep) state, or together with the main processor 1121 while the main processor 1121 is in an active state (e.g., executing an application). According to an embodiment of the disclosure, the auxiliary processor 1123 (e.g., an image signal processor or a communication processor) may be implemented as part of another component (e.g., the camera module 1180 or the communication module 1190) functionally related to the auxiliary processor 1123.

The memory 1130 may store various data used by at least one component (e.g., the processor 1120 or the sensor module 1176) of the electronic device 1101. The various data may include, for example, software (e.g., the program 1140) and input data or output data for a command related thereto. The memory 1130 may include the volatile memory 1132 or the non-volatile memory 1134.

The program 1140 may be stored in the memory 1130 as software, and may include, for example, an operating system (OS) 1142, middleware 1144, or an application 1146.

The input device 1150 may receive a command or data to be used by other component (e.g., the processor 1120) of the electronic device 1101, from the outside (e.g., a user) of the electronic device 1101. The input device 1150 may include, for example, a microphone, a mouse, a keyboard, or a digital pen (e.g., a stylus pen).

The sound output device 1155 may output sound signals to the outside of the electronic device 1101. The sound output device 1155 may include, for example, a speaker or a receiver. The speaker may be used for general purposes, such as playing multimedia or playing record, and the receiver may be used for an incoming calls. According to an embodiment of the disclosure, the receiver may be implemented as separate from, or as part of the speaker.

The display device 1160 may visually provide information to the outside (e.g., a user) of the electronic device 1101. The display device 1160 may include, for example, a display, a hologram device, or a projector and control circuitry to control a corresponding one of the display, hologram device, and projector. According to an embodiment of the disclosure, the display device 1160 may include touch circuitry adapted to detect a touch, or sensor circuitry (e.g., a pressure sensor) adapted to measure the intensity of force incurred by the touch.

The audio module 1170 may convert a sound into an electrical signal and vice versa. According to an embodiment of the disclosure, the audio module 1170 may obtain the sound via the input device 1150, or output the sound via the sound output device 1155 or a headphone of an external electronic device (e.g., an electronic device 1102) directly (e.g., wiredly) or wirelessly coupled with the electronic device 1101.

The sensor module 1176 may detect an operational state (e.g., power or temperature) of the electronic device 1101 or an environmental state (e.g., a state of a user) external to the electronic device 1101, and then generate an electrical signal or data value corresponding to the detected state. According to an embodiment of the disclosure, the sensor module 1176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 1177 may support one or more specified protocols to be used for the electronic device 1101 to be coupled with the external electronic device (e.g., the electronic device 1102) directly (e.g., wiredly) or wirelessly. According to an embodiment of the disclosure, the interface 1177 may include, for example, a high definition multimedia interface (HDMI), a universal serial bus (USB) interface, a secure digital (SD) card interface, or an audio interface.

A connecting terminal 1178 may include a connector via which the electronic device 1101 may be physically connected with the external electronic device (e.g., the electronic device 1102). According to an embodiment of the disclosure, the connecting terminal 1178 may include, for example, a HDMI connector, a USB connector, a SD card connector, or an audio connector (e.g., a headphone connector).

The haptic module 1179 may convert an electrical signal into a mechanical stimulus (e.g., a vibration or a movement) or electrical stimulus which may be recognized by a user via his tactile sensation or kinesthetic sensation. According to an embodiment of the disclosure, the haptic module 1179 may include, for example, a motor, a piezoelectric element, or an electric stimulator.

The camera module 1180 may capture a still image or moving images. According to an embodiment of the disclosure, the camera module 1180 may include one or more lenses, image sensors, image signal processors, or flashes.

The power management module 1188 may manage power supplied to the electronic device 1101. According to one embodiment of the disclosure, the power management module 1188 may be implemented as at least part of, for example, a power management integrated circuit (PMIC).

The battery 1189 may supply power to at least one component of the electronic device 1101. According to an embodiment of the disclosure, the battery 1189 may include, for example, a primary cell which is not rechargeable, a secondary cell which is rechargeable, or a fuel cell.

The communication module 1190 may support establishing a direct (e.g., wired) communication channel or a wireless communication channel between the electronic device 1101 and the external electronic device (e.g., the electronic device 1102, the electronic device 1104, or the server 1108) and performing communication via the established communication channel. The communication module 1190 may include one or more communication processors that are operable independently from the processor 1120 (e.g., the application processor (AP)) and supports a direct (e.g., wired) communication or a wireless communication. According to an embodiment of the disclosure, the communication module 1190 may include a wireless communication module 1192 (e.g., a cellular communication module, a short-range wireless communication module, or a global navigation satellite system (GNSS) communication module) or a wired communication module 1194 (e.g., a local area network (LAN) communication module or a power line communication (PLC) module). A corresponding one of these communication modules may communicate with the external electronic device via the first network 1198 (e.g., a short-range communication network, such as Bluetooth™, wireless-fidelity (Wi-Fi) direct, or infrared data association (IrDA)) or the second network 1199 (e.g., a long-range communication network, such as a cellular network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 1192 may identify and authenticate the electronic device 1101 in a communication network, such as the first network 1198 or the second network 1199, using subscriber information (e.g., international mobile subscriber identity (IMSI)) stored in the subscriber identification module 1196.

The antenna module 1197 may transmit or receive a signal or power to or from the outside (e.g., the external electronic device) of the electronic device 1101. According to an embodiment of the disclosure, the antenna module 1197 may include an antenna including a radiating element composed of a conductive material or a conductive pattern formed in or on a substrate (e.g., PCB). According to an embodiment of the disclosure, the antenna module 1197 may include a plurality of antennas. In such a case, at least one antenna appropriate for a communication scheme used in the communication network, such as the first network 1198 or the second network 1199, may be selected, for example, by the communication module 1190 (e.g., the wireless communication module 1192) from the plurality of antennas. The signal or the power may then be transmitted or received between the communication module 1190 and the external electronic device via the selected at least one antenna. According to an embodiment of the disclosure, another component (e.g., a radio frequency integrated circuit (RFIC)) other than the radiating element may be additionally formed as part of the antenna module 1197.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment of the disclosure, commands or data may be transmitted or received between the electronic device 1101 and the external electronic device 1104 via the server 1108 coupled with the second network 1199. Each of the electronic devices 1102 and 1104 may be a device of a same type as, or a different type, from the electronic device 1101. According to an embodiment of the disclosure, all or some of operations to be executed at the electronic device 1101 may be executed at one or more of the external electronic devices 1102, 1104, or 1108. For example, if the electronic device 1101 should perform a function or a service automatically, or in response to a request from a user or another device, the electronic device 1101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 1101. The electronic device 1101 may provide the outcome, with or without further processing of the outcome, as at least part of a reply to the request. To that end, a cloud computing, distributed computing, or client-server computing technology may be used, for example.

As used herein, the term "module" may include a unit implemented in hardware, software, or firmware, and may interchangeably be used with other terms, for example, "logic", "logic block", "part", or "circuitry". A module may be a single integral component, or a minimum unit or part thereof, adapted to perform one or more functions. For example, according to an embodiment of the disclosure, the module may be implemented in a form of an application-specific integrated circuit (ASIC).

Various embodiments as set forth herein may be implemented as software (e.g., the program 1140) including one or more instructions that are stored in a storage medium (e.g., internal memory 1136 or external memory 1138) that is readable by a machine (e.g., the electronic device 1101). For example, a processor (e.g., the processor 1120) of the machine (e.g., the electronic device 1101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment of the disclosure, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments of the disclosure, each component (e.g., a module or a program) of the above-described components may include a single entity or multiple entities. According to various embodiments of the disclosure, one or more of the above-described components may be omitted, or one or more other components may be added. Alternatively or additionally, a plurality of components (e.g., modules or programs) may be integrated into a single component. In such a case, according to various embodiments of the disclosure, the integrated component may still perform one or more functions of each of the plurality of components in the same or similar manner as they are performed by a corresponding one of the plurality of components before the integration. According to various embodiments of the disclosure, operations performed by the module, the program, or another component may be carried out sequentially, in parallel, repeatedly, or heuristically, or one or more of the operations may be executed in a different order or omitted, or one or more other operations may be added.

According to the various embodiments of the disclosure, the electronic device of the sliding type may stably configure the sensor structure thereof and may provide the sensor structure in an optimal operating form, thereby enabling stable image acquisition and processing.

In addition, the disclosure may provide various effects that are directly or indirectly recognized.

While the disclosure has been shown and described with reference to various embodiments thereof, it will be understood by those skilled in the art that various changes in form and details may be made therein without departing from the spirit and scope of the disclosure as defined by the appended claims and their equivalents.

What is claimed is:

1. An electronic device of a sliding type, the electronic device comprising:
   a first cover;
   a second cover coupled with the first cover and configured to perform a sliding operation;
   a display, an exposed area of which is changed in size in response to the sliding operation of the second cover;
   a panel support part disposed on one side of a rear surface of the display with respect to a front surface of the display, the panel support part including a first hole exposed in response to the sliding operation of the second cover;
   a rotary shaft configured to make contact with at least part of the panel support part and rotate in response to the sliding operation of the second cover; and
   a sensor, at least part of which is disposed under the first hole.

2. The electronic device of claim 1, wherein the sensor includes a camera configured to obtain an image through the first hole.

3. The electronic device of claim 1, further comprising:
   a protection member disposed in the first hole.

4. The electronic device of claim 3, wherein the protection member includes a specified transparency.

5. The electronic device of claim 3, wherein at least part of the protection member is formed of a flexible material.

6. The electronic device of claim 1, wherein the first hole is moved into the second cover in response to a sliding restoration operation of the second cover for reducing an extended area of the display in a state in which the sliding operation of the second cover is performed and an area of the display is extended.

7. The electronic device of claim 1, wherein part of the display corresponding to the first hole is formed to be transparent, or the display is formed of a transparent display.

8. The electronic device of claim 1, wherein the display includes:
   a second hole formed in a position corresponding to a hole of the panel support part; and
   a protection member configured to fill the second hole.

9. The electronic device of claim 8,
   wherein the display includes:
      a first display area; and
      a second display area continuous with the first display area,
   wherein at least part of the second display area is exposed to the outside depending on the sliding operation of the second cover, and
   wherein the second hole is disposed in the second display area.

10. The electronic device of claim 1, further comprising:
an actuator module configured to generate power related to the sliding operation of the second cover; and
a processor operatively connected with the actuator module.

11. The electronic device of claim 10, wherein the processor is configured to control to perform the sliding operation by operating the actuator module in response to a user input.

12. The electronic device of claim 10, wherein the processor is configured to control to automatically activate the sensor, when receiving a user input for requesting a sliding operation of the second cover related to extension of an area of the display.

13. The electronic device of claim 12, wherein the processor is further configured to control to output, on the display, a preview image obtained through the sensor.

14. The electronic device of claim 10, wherein the processor is configured to control the actuator module to perform a sliding operation of the second cover related to extension of an area of the display, when receiving a user input related to activation of the sensor.

15. The electronic device of claim 10, wherein the processor is configured to:
control to output, on the display, an icon related to activation of the sensor, and
control the actuator module to perform a sliding operation of the second cover related to extension of an area of the display, when receiving a user input related to selection of the icon.

16. The electronic device of claim 10, wherein the processor is configured to control the actuator module to perform a sliding restoration operation of the second cover related to reduction of an area of the display, when receiving a user input for making a request to terminate an application related to operation of the sensor.

17. The electronic device of claim 10, wherein the processor is configured to control to deactivate the sensor, when receiving a user input for requesting a sliding restoration operation of the second cover related to reduction of an area of the display.

18. The electronic device of claim 10, wherein the processor is configured to control to automatically terminate an application related to operation of the sensor, when receiving a user input for requesting a sliding restoration operation of the second cover related to reduction of an area of the display.

19. The electronic device of claim 1, further comprising:
a processor operatively connected with the sensor,
wherein the processor is configured to control to automatically activate an application related to the sensor, when a sliding operation of the second cover related to extension of an area of the display is detected.

20. The electronic device of claim 1, further comprising:
a processor operatively connected with the sensor,
wherein the processor is configured to control to automatically terminate an application related to the sensor, when a sliding operation of the second cover related to reduction of an area of the display is detected.

* * * * *